United States Patent
Won et al.

(10) Patent No.: US 9,924,018 B2
(45) Date of Patent: Mar. 20, 2018

(54) MULTI DISPLAY METHOD, STORAGE MEDIUM, AND ELECTRONIC DEVICE

(71) Applicant: Samsung Electronics Co., Ltd., Suwon-si, Gyeonggi-do (KR)

(72) Inventors: Sung-Joon Won, Seongnam-si (KR); Dae-Sik Hwang, Daegu (KR); Hyung-Do Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 14/471,555

(22) Filed: Aug. 28, 2014

(65) Prior Publication Data
US 2015/0065056 A1     Mar. 5, 2015

(30) Foreign Application Priority Data
Aug. 30, 2013 (KR) ........................ 10-2013-0104495

(51) Int. Cl.
*G06F 3/14* (2006.01)
*H04M 1/725* (2006.01)
*G09G 5/14* (2006.01)

(52) U.S. Cl.
CPC ........ *H04M 1/7253* (2013.01); *G06F 3/1462* (2013.01); *H04M 1/72522* (2013.01); *G09G 5/14* (2013.01); *G09G 2360/04* (2013.01); *H04M 2250/16* (2013.01)

(58) Field of Classification Search
CPC ............ G09G 2360/04; H04M 1/7253; G06F 3/14–3/153
See application file for complete search history.

(56) References Cited

U.S. PATENT DOCUMENTS

| | | | | |
|---|---|---|---|---|
| 8,990,713 | B2 * | 3/2015 | Reeves | G06F 3/1438 715/761 |
| 2006/0164326 | A1 | 7/2006 | Date | |
| 2006/0282855 | A1 | 12/2006 | Margulis | |
| 2009/0315807 | A1 | 12/2009 | Hsu | |
| 2010/0066698 | A1 * | 3/2010 | Seo | G06F 3/04883 345/173 |
| 2010/0088634 | A1 * | 4/2010 | Tsuruta | G06F 3/0488 715/800 |
| 2010/0261507 | A1 * | 10/2010 | Chang | G06F 3/1454 455/566 |
| 2011/0175930 | A1 * | 7/2011 | Hwang | G06F 3/0481 345/629 |
| 2011/0205178 | A1 * | 8/2011 | Yoshida | G06F 1/1616 345/173 |

(Continued)

FOREIGN PATENT DOCUMENTS

| | | |
|---|---|---|
| CN | 101676853 A | 3/2010 |
| CN | 102238279 A | 11/2011 |

(Continued)

*Primary Examiner* — Gennadiy Tsvey
(74) *Attorney, Agent, or Firm* — Jefferson IP Law, LLP

(57) ABSTRACT

A multi display method by a first electronic device is provided. The method includes executing first and second applications, transmitting screen data of the second application to a second electronic device, receiving an input via the second electronic device, changing the screen data of the second application based on the user input, and transmitting the changed screen data of the second application to the second electronic device.

16 Claims, 20 Drawing Sheets

(56) References Cited

U.S. PATENT DOCUMENTS

| | | | |
|---|---|---|---|
| 2011/0275391 A1 | 11/2011 | Lee et al. | |
| 2012/0040719 A1* | 2/2012 | Lee | G06F 1/1626 455/557 |
| 2012/0040720 A1* | 2/2012 | Zhang | H04M 1/7253 455/557 |
| 2012/0084792 A1* | 4/2012 | Benedek | G06F 9/544 719/313 |
| 2012/0084793 A1* | 4/2012 | Reeves | H04L 67/1095 719/313 |
| 2012/0086716 A1 | 4/2012 | Reeves et al. | |
| 2012/0088548 A1* | 4/2012 | Yun | G08C 17/02 455/557 |
| 2012/0088549 A1* | 4/2012 | Yun | G06F 1/1647 455/557 |
| 2012/0206391 A1* | 8/2012 | Kim | H04M 1/7253 345/173 |
| 2012/0208466 A1* | 8/2012 | Park | G06F 1/1601 455/41.3 |
| 2012/0262494 A1* | 10/2012 | Choi | G06F 3/0481 345/672 |
| 2012/0274656 A1* | 11/2012 | Kang | G06F 1/1632 345/619 |
| 2012/0304114 A1* | 11/2012 | Wong | G06F 3/0488 715/800 |
| 2013/0019183 A1* | 1/2013 | Reeves | G06F 9/4443 715/745 |
| 2013/0145291 A1 | 6/2013 | Weber et al. | |
| 2013/0156090 A1 | 6/2013 | Rakar | |
| 2013/0162502 A1* | 6/2013 | Lee | G09G 5/003 345/1.2 |
| 2013/0165098 A1* | 6/2013 | Nakazawa | H04W 76/02 455/418 |
| 2013/0278484 A1* | 10/2013 | Hwang | G06F 3/1423 345/2.3 |
| 2014/0053097 A1* | 2/2014 | Shin | G06F 9/4443 715/779 |

FOREIGN PATENT DOCUMENTS

| | | |
|---|---|---|
| CN | 103155692 A | 6/2013 |
| EP | 2 166 437 A2 | 3/2010 |
| EP | 2 385 689 A1 | 11/2011 |
| EP | 2 605 611 A1 | 6/2013 |

* cited by examiner

MULTI DISPLAY METHOD, STORAGE MEDIUM, AND ELECTRONIC DEVICE

CROSS-REFERENCE TO RELATED APPLICATION(S)

This application claims the benefit under 35 U.S.C. § 119(a) of a Korean patent application filed on Aug. 30, 2013 in the Korean Intellectual Property Office and assigned Serial number 10-2013-0104495, the entire disclosure of which is hereby incorporated by reference.

TECHNICAL FIELD

The present disclosure relates to a display method using an electronic device.

BACKGROUND

Recently, interests in a digital multimedia service using a mobile phone, such as a video, have increased.

In addition to a mobile phone which can use only one function in one screen, a mobile phone which can perform multitasking while freely moving among a plurality of applications has been released. However, although the mobile phone has a multitasking function, the utilization of the multitasking function is not yet widely adopted due in part to a small screen size of the mobile phone.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device which can use only one function in one screen is inconvenient in that the electronic device cannot perform multitasking while freely moving among a plurality of applications. Further, since an electronic device which can use split screens is required to split a small mobile screen, the design or utilization intended by an application cannot be provided to a user and thus causes inconvenience due to a small screen.

In accordance with an aspect of the present disclosure, a multi display method by a first electronic device is provided. The method includes executing first and second applications, transmitting screen data of the second application to a second electronic device, receiving an input via the second electronic device, and changing the screen data of the second application based on the input and transmitting the changed screen data of the second application to the second electronic device.

In accordance with another aspect of the present disclosure, a second electronic device for a multi display is provided. The second electronic device includes a display unit, a communication unit configured to receive screen data of a second application from a first electronic device, and a controller configured to generate a screen of the second application based on the screen data of the second application, to display the screen of the second application on a preset sharing screen of the display unit, to detect an input for the screen of the second application, and to transmit data of the detected input to the first electronic device through the communication unit.

In accordance with another aspect of the present disclosure, a first electronic device for a multi display is provided. The first electronic device includes a display unit configured to display a screen, a communication unit configured to one of transmit and receive data, and a controller configured to execute first and second applications, to transmit screen data of the second application to a second electronic device through the communication unit, to receive an input from the second electronic device through the communication unit, to change screen data of the second application based on the input, and to transmit the changed screen data of the second application to the second electronic device through the communication unit.

According to various embodiments of the present disclosure, it is possible to perform multitasking without splitting a screen of an electronic device.

According to various embodiments of the present disclosure, it is possible to maintain an original screen intended by an application and provide better utilization in comparison with a multi window using screens split from one screen.

According to various embodiments of the present disclosure, since applications of one electronic device are distributively executed in a plurality of electronic devices, various applications can be simultaneously used.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
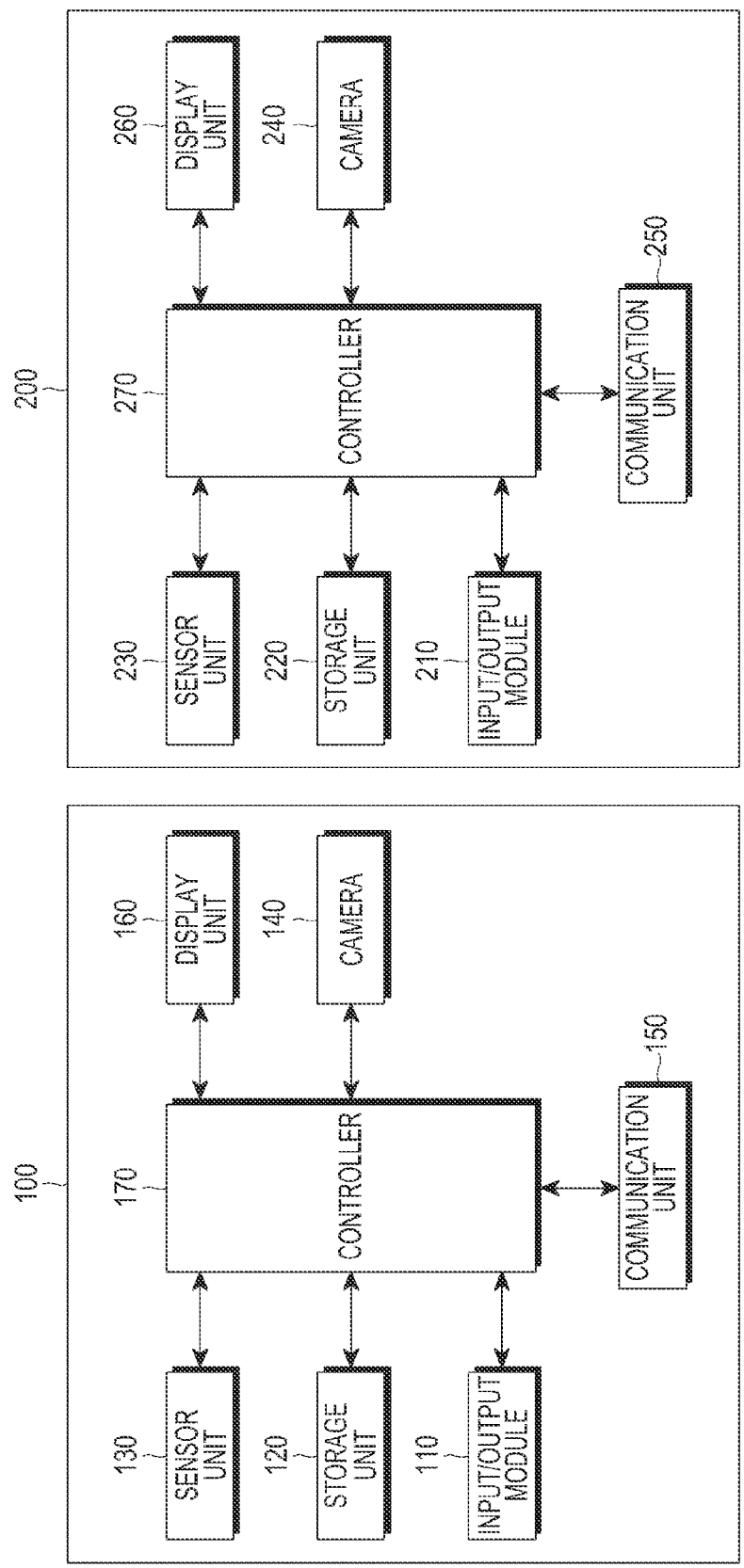
FIG. 1 illustrates a multi display providing system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Unless defined differently herein, all terms used herein, which include technical terminologies or scientific terminologies, have the same meaning as would be understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined so in the present disclosure.

In the present disclosure, an electronic device may be any of a variety of devices, and the electronic device may be called a terminal, a portable terminal, a mobile terminal, a communication terminal, a portable communication terminal, a portable mobile terminal, a display device, or the like.

For example, the electronic device may be a smart phone, a mobile phone, a navigation device using Global Positioning System (GPS) or other means, a game machine, a television (TV), a Personal Computer (PC), such as a notebook PC, a desktop PC, a tablet PC, or the like, a Personal Media Player (PMP), a Personal Digital Assistant (PDA), or the like. The electronic device may be implemented as a portable communication terminal of a handheld size having a wireless communication function. Further, the electronic device may be a flexible device or a flexible display device.

The electronic device may communicate with an external electronic device, such as a server or the like, or perform an operation through an interworking with the external electronic device. For example, the electronic device may transmit an image photographed by a camera and/or position information detected by a sensor unit to the server through a network. The network may be a mobile or cellular communication network, a Local Area Network (LAN), a Wireless Local Area Network (WLAN), a Wide Area Network (WAN), an Internet, a Small Area Network (SAN), or the like, but is not limited thereto.

A multi display method according to various embodiments of the present disclosure is implemented by a system including first and second electronic devices 100 and 200.

FIG. 1 illustrates a multi display providing system according to an embodiment of the present disclosure.

The system includes the first and second electronic devices 100 and 200. Although the present embodiment illustrates that the first and second electronic devices 100 and 200 have the same configuration, the first and second electronic devices 100 and 200 may have different configurations. The following description will be made based on the first electronic device 100, but the description may be applied to the second electronic device 200. Similarly, the description of the second electronic device 200 may be applied to the first electronic device 100.

Referring to FIG. 1, there is illustrated a representative configuration of an electronic device, and some components may be omitted or modified as necessary.

The first electronic device 100 may communicate with the second electronic device 200 or perform an operation through an interworking with the second electronic device 200. The first electronic device 100 may transmit screen data to the second electronic device 200 through a network or a direction connection. The first electronic device 100 may control the second electronic device 200 or operate according to a control of the second electronic device 200, and such a control may be implemented in various ways.

The first electronic device 100 may include a first input/output module 110, a first storage unit 120, a first sensor unit 130, a first camera 140, a first communication unit 150, a first display unit 160, and a first controller 170.

The first input/output module 110, as a means to receive a user input or to inform a user of information, may include one or more buttons, a microphone, a speaker, a vibration motor, a connector, a keypad, a keyboard, a mouse, a trackball, a joystick, cursor direction keys, a cursor control, and/or the like.

The button may be formed on a front side, a lateral side, and/or a back side, and may include a power/lock button, a volume button, a menu button, a home button, a back button, or a search button.

The microphone receives a voice or sound and generates an electrical signal according to a control of the first controller 170.

The speaker may output sounds corresponding to various signals (for example, a radio signal, a broadcasting signal, a digital audio file, a digital video file, photographing and the like) to the outside of the first electronic device 100 according to a control of the first controller 170. The speaker may output a sound corresponding to a function performed by the first electronic device 100. One or more speakers may be formed on a proper position or positions of the first electronic device 100.

The vibration motor may transform an electrical signal into a mechanical vibration according to a control of the first controller 170. For example, when the first electronic device 100 in a vibration mode receives a voice call from another electronic device (not illustrated), the vibration motor operates. One or more vibration motors may be formed within the first electronic device 100. The vibration motor may operate in response to a touch action of the user made on the first display unit 160 or successive motions of the touch on the first display unit 160.

The connector may be used as an interface for connecting the first electronic device 100 with a server, an external electronic device, or a power source. According to a control of the first controller 170, the first electronic device 100 may transmit data stored in the first storage unit 120 of the first electronic device 100 to an external device through a wired cable connected to the connector, or the first electronic device 100 may receive from the external device through the wired cable connected to the connector. Power may be input from a power source through the wired cable connected to the connector or a battery may be charged.

The keypad may receive a key input from the user to control the first electronic device 100. The keypad may include a physical keypad formed on the first electronic device 100 or a virtual keypad displayed on the first display unit 160.

The first storage unit 120 may store data for driving one or more applications. The first storage unit 120 may store images for providing a Graphical User Interface (GUI) related to one or more applications, user information, data or a database such as a document, background images (menu screen, idle screen and the like) or operating programs required for driving the first electronic device 100, and images photographed by a camera. The first storage unit 120 is a machine (for example, a computer)-readable medium, and the term of the machine-readable medium may be defined as a medium for providing data to the machine to perform a predetermined function. The machine-readable medium may be a storage medium. The first storage unit 120 may include a non-volatile medium, a volatile medium and/or the like. All of these media should be a type that allows the commands transferred by the media to be detected by a physical instrument through which the machine reads the commands.

The machine-readable medium includes at least one of a floppy disk, a flexible disk, a hard disk, a magnetic tape, a Compact Disc Read-Only Memory (CD-ROM), an optical disk, a punch card, a paper tape, a Random Access Memory (RAM), a Programmable Read-Only Memory (PROM), an Erasable PROM (EPROM), or a flash-EPROM, but is not limited thereto.

The first sensor unit 130 may include one or more sensors that detect a state (position, direction, motion and/or the like) of the first electronic device 100. For example, the first sensor unit 130 may include a proximity sensor that detects whether a user approaches the first electronic device 100 or a motion/direction sensor that detects a motion of the electronic device 100 (for example, rotation, acceleration, deceleration, vibration, and/or the like of the first electronic device 100). Further, the motion/direction sensor may include an acceleration sensor (or gravity sensor) that measures a slope and detects a change in linear speed, a gyro sensor that detects an angular speed, an impact sensor, a GPS sensor, a compass sensor (or a geomagnetic sensor) that detects a direction, or an inertia sensor that detects inertial force of motion and provides various pieces of information, such as acceleration, speed, direction, and distance of a moving object to be measured. The first sensor unit 130 may detect a state of the first electronic device 100, generate a signal corresponding to the detection, and transmit the generated signal to the first controller 170. For example, the GPS sensor may receive radio waves from a plurality of GPS satellites (not illustrated) in Earth orbit, and may calculate a GPS position of the first electronic device 100 using a time of arrival of the radio waves from the GPS satellites (not illustrated) to the first electronic device 100. The compass sensor may calculate an orientation or direction of the first electronic device 100.

The first camera 140 may include a lens system that enables convergence of lights incident from the outside so as to form an optical image of a subject, an image sensor that converts an optical image into an electric image signal or data and outputs the electric image signal or data, and a driver that drives the image sensor according to a control of the first controller 170, and may further include a flash and the like.

The first communication unit 150 is provided for a direct connection with a server or an external electronic device or a connection with the server or the external electronic device through a network. The first communication unit 150 may be a wired or wireless communication unit. The first communication unit 150 transmits data from the first controller 170, the first storage unit 120, or the first camera 140 through a wired cable or wirelessly. Alternatively, the first communication unit 150 receives data from an external communication line or the air through a wired cable or wirelessly and transmits the data to the first controller 170 or store the data in the first storage unit 120.

The first communication unit 150 may include a mobile communication module, a WLAN module, a LAN module, and/or the like. The first communication unit 150 may include an Integrated Services Digital Network (ISDN) card, a modem, a LAN card, an infrared module, a BLUETOOTH module, a ZIGBEE module, or a wireless module, but is not limited thereto.

The mobile communication module enables the first electronic device 100 to be connected with an external device through mobile communication by using one or more antennas according to a control of the first controller 170. The mobile communication module exchanges data, such as a voice call, a video call, a Short Message Service (SMS) message, or a Multimedia Messaging Service (MMS) message, with a mobile phone, a smart phone, a computer, or another device, which has a phone number input or a network address into the first electronic device 100. Alternatively, The mobile communication module transmits/receives a Radio Frequency (RF) signal for unidirectional transmission or reception.

The WLAN module may be connected to the Internet in a place where a wireless Access Point (AP) (not illustrated) is installed according to a control of the first controller 170. The WLAN module supports the wireless LAN provision (IEEE802.11x) of the Institute of American Electrical and Electronics Engineers (IEEE). The LAN module may wirelessly perform short-range communication between the first electronic device 100 and an image forming apparatus (not illustrated) according to a control of the first controller 170. Short-range communication techniques may include BLUETOOTH, Infrared Data Association (IrDA), and the like.

The first display unit 160 displays the image or data input from the first controller 170 on a screen. As the first display unit 160, a Liquid Crystal Display (LCD), a touch screen, and/or the like may be used. The first display unit 160 displays an image according to a control of the first controller 170. When a user input means such as a finger, a stylus pen, or the like contacts a surface of the first display unit 160, the first display unit 160 generates a key contact interrupt, and outputs, to the first controller 170, user input information including an input coordinate and an input state according to a control of the controller 170.

The first display unit 160 may provide GUIs corresponding to various services (for example, a phone call, data transmission, broadcasting, and photographing of a picture/video) to the user. The first display unit 160 may transmit user input information corresponding to one or more touches input into the GUI to the first controller 170. The first display unit 160 may receive one or more touches through a user's body (for example, a finger) or a touch input means (for example, a stylus pen). Also, the first display unit 160 may receive successive motions of one touch. The first display unit 160 may transmit user input information corresponding to the successive motions of the input touch to the first controller 170.

The touch is not limited to the contact between the first display unit 160 and the user's body or the touch input means, and may include a non-contact (for example, a detectable interval between the first display unit 160 and the user's body or the touchable input means is larger than 0 and smaller than or equal to 5 cm). The detectable interval may become longer according to a hovering detection capability of the first display unit 160. The first display unit 160 may be a touch screen in, for example, a resistive type, a capacitive type, an infrared type, an acoustic wave type, an ElectroMagnetic (EM) type, or an ElectroMagnetic Resonance (EMR) type.

The first controller 170 executes an application according to user input information, and the application performs a program operation according to the user input information. The user input may include an input through the first input/output module 110, the first display unit 160, or the first sensor unit 130, or an input based on the first camera 140. The first controller 170 may include a bus for information communication and a processor connected with the bus for information processing. The first controller 140 may include a Central Processing Unit (CPU), an Application Processor (AP), a Communication Processor (CP) and/or the like.

The first controller 170 may further include a Random Access Memory (RAM) connected with the bus to temporarily store information required by the processor and a Read Only Memory (ROM) connected with the bus to store static information required by the processor.

The first controller 170 controls general operations of the first electronic device 100 and serves to perform a multi display method according to various embodiments of the present disclosure.

The second electronic device 200 may include a second input/output module 210, a second storage unit 220, a second sensor unit 230, a second camera 240, a second communication unit 250, a second display unit 260, and a second controller 270. A description of the components of the second electronic device 200 is the same as the description of the components having the same names of the first electronic device 100 except for the ordinal number.

The multi display method according to various embodiments of the present disclosure is performed by an interworking between a source device and a sink device configuring its own screen according to screen data received from the source device. In the present embodiment, the first electronic device 100 corresponds to the source device and the second electronic device 200 corresponds to the sink device. The multi display method according to various embodiments of the present disclosure may be applied to a plurality of source devices and a single sink device, or a single source device and a plurality of sink devices.

The first electronic device 100 displays first application screen data on the first display unit 160. The first electronic device 100 generates second application screen data to be displayed on the second display unit 260 of the second electronic device 200 according to a user's selection or an automatic configuration.

The application may be a voice recognition application, a schedule management application, a document making application, a music application, an Internet application, a map application, a camera application, an e-mail application, an image editing application, a search application, a file search application, a video application, a game application, a Social Network Service (SNS) application, a phone application, a message application, a home application, a writing input application, a text input application (or keyboard/keypad application), and/or the like.

The application screen may correspond to a screen shown through the first display unit 160 when the application is executed and the application screen may include a plurality of objects. The application screen data may correspond to data for configuring the application screen and indicate a plurality of objects. Hereinafter, an application screen and a screen of an application may be used as the same meaning. The application screen may be referred to as an application screen image or an application view and may refer to an application window in some cases. The window refers to a frame displayed on the screen.

The object may be displayed on the application screen and may largely include an image or a text, for example, an application window, a menu, a function item (or menu item), a document, a widget, a picture, a video, an email, an SMS message and an MMS message, a folder, a button, a shortcut icon, a thumbnail image, and/or the like. The object may be selected, executed, deleted, canceled, stored or changed by a user input means (for example, a finger, a stylus pen, and/or the like). The object may be used as a meaning including a button, a shortcut icon, a thumbnail image, or a folder storing one or more objects in the first electronic device 100.

The first electronic device 100 transmits second application screen data to the second electronic device 200, receives user input data from the second electronic device 200, and changes screen data based on the user input data. According to the change of the screen data, the first and second application screen data may be simultaneously changed and displayed, or only one of the first and second application screen data may be changed and displayed.

In the following description, it should be understood that any operation by each electronic device is performed as the controller included in each electronic device concurrently controls other components. Further, data generated within each electronic device or received from the outside of each electronic device may be stored in the storage unit. Based on the description of the operation of each component within each electronic device, it should be understood that the operation performed by the controller is actually performed using the corresponding component. For example, it should be understood that the communication unit is used for communication with an external device, the display unit is used for displaying data, the camera is used for photographing, and the sensor unit is used for detecting a state of the electronic device or a surrounding environment.

Figure 2:
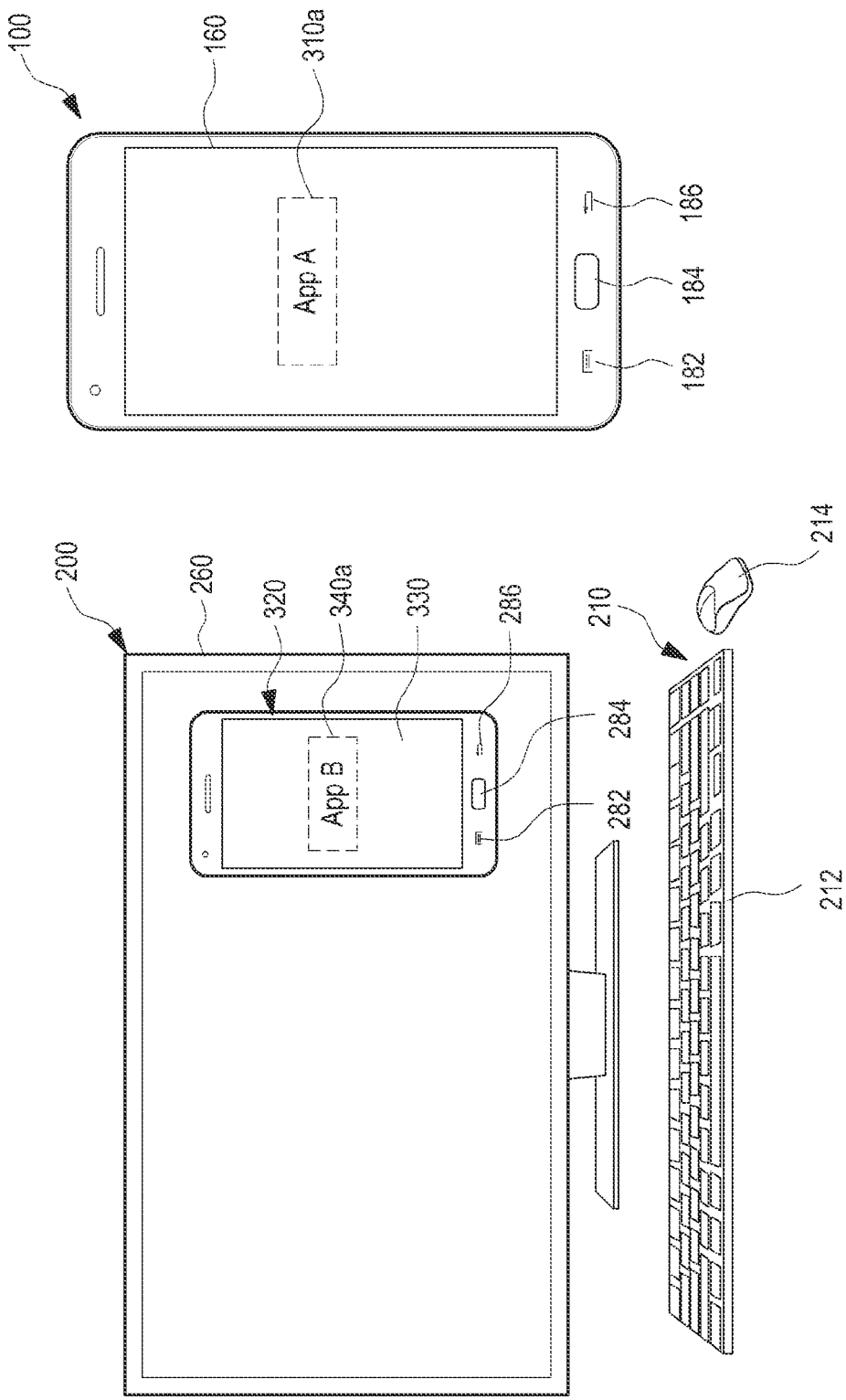
FIG. 2 is a view describing a multi display method according to an embodiment of the present disclosure.

FIG. 2 is a view describing a multi display method according to an embodiment of the present disclosure.

FIG. 2 illustrates the first and second electronic devices 100 and 200. In the present embodiment, the first electronic device 100 corresponds to a mobile phone or a smart phone and the second electronic device 200 corresponds to a personal computer.

The first electronic device 100 includes the first display unit 160 and a plurality of soft keys 182, 184, and 186. The first electronic device 100 displays a first application screen 310a on the first display unit 160 and transmits second application screen data to the second electronic device 200.

The plurality of soft keys may include a first menu key 182, a first home key 184, and a first back key 186 (or cancel key).

The first menu key 182 provides a connection menu which can be displayed on the first display unit 160. The connection menu may include a widget addition menu, a background screen changing menu, a search menu, an editing menu, an environment configuration menu, and/or the like.

The first home key 184 is used for displaying a main home screen (that is, first page configuring the home screen) on the first display unit 160. For example, when the home key 184 is selected in a state where any home screen (that is, a page other than the first page configuring the home screen) different from the main home screen, the menu screen, or application screen other than the home screen is displayed on the first display unit 160, the main home screen may be displayed on the first display unit 160. Further, when the first home key 184 is selected while an application screen other than the home screen is displayed on the first display unit 160, the main home screen may be displayed on the first display unit 160. In addition, the first home key 184 may enable recently used applications to be displayed on the first display unit 160 and may be used to display a task manager.

The first back key 186 may be used for displaying an application screen which was executed just before the currently executed application screen or terminating a most recently used application.

The second electronic device 200 may include the second display unit 260 and the second input/output module 210, and the second input/output module 210 may include a keyboard 212 and a mouse 214.

The second electronic device 200 displays a sharing screen 320, corresponding to the first electronic device 100, on the second display unit 260. The sharing screen 320 may have an appearance similar to or the same as an appearance of the first electronic device 100, or may have a predetermined form of a window. The sharing screen 320 includes a display unit area 330 and a plurality of selectable second soft keys 282, 284, and 286. The plurality of second soft keys may include a second menu key 282, a second home key 284, and a second back key 286 (or cancel key). The second menu key 282, the second home key 284, and the second back key 286 correspond to the first menu key 182, the first home key 184, and the first back key 186, respectively.

The second electronic device 200 displays a second application screen 340a configured according to second application screen data on the display unit area 330 of the sharing screen 320. The user may change attributes of the display unit area 330 such as a size, a shape, a resolution, and/or the like of the display unit area 330. Further, the second electronic device 200 may transmit information on the changed attributes of the sharing screen 320 or the display unit area 330 to the first electronic device 100 and receive second application screen data to which the changed attribute information is applied from the first electronic device 100.

For example, the first electronic device 100 may execute and display a first application, and the first or second electronic device 100 or 200 may execute the first application and display the first application on the second electronic device 200.

Figure 3:
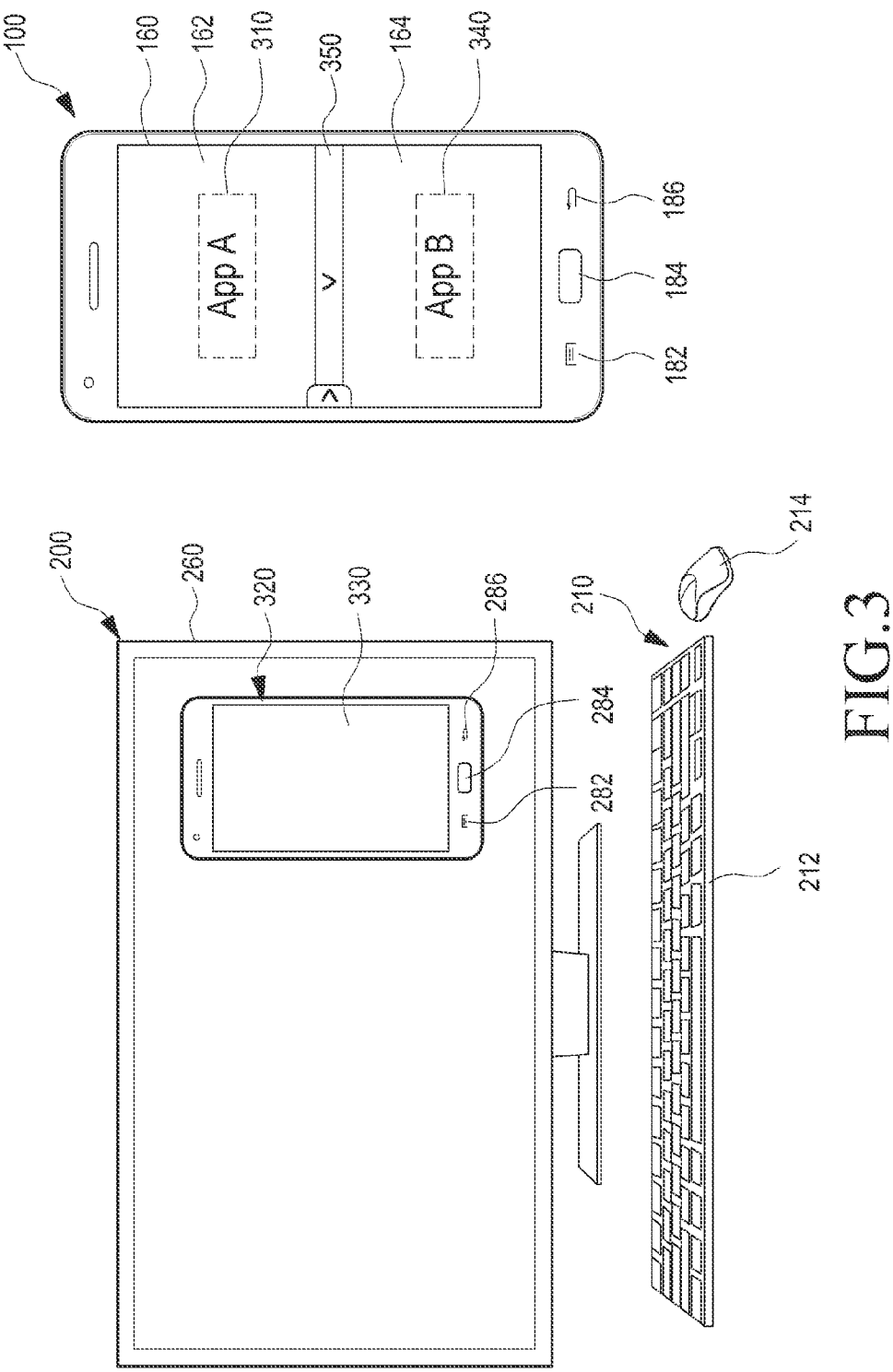
FIG. 3 is a view describing the multi display method according to another embodiment of the present disclosure.

FIG. 3 is a view describing the multi display method according to another embodiment of the present disclosure.

In the present embodiment, the first electronic device 100 executes and displays the first and second applications, and then may stop displaying a second application screen 340 on the first device 100 and display the second application screen 340 on the second electronic device 200.

The first electronic device 100 executes the first and second applications and displays the first and second applications on different areas of the first display unit 160. Alternatively, the first electronic device 100 may display the first and second applications in an overlapping manner on the first display unit 160. In the present embodiment, the first electronic device 100 displays the first and second applications such that the first and second applications are separated by a partition bar 350.

According to a user's request or an automatic configuration, as illustrated in FIG. 3, the first electronic device 100 may expand the first application screen 310 displayed on an upper area 162 of the first display unit 160 such that the first application screen 310 is expanded to a lower area 164 of the first display unit 160. Further, as illustrated in FIG. 3, the first electronic device 100 stops displaying the second application screen 340 displayed on the lower area 164 of the first display unit 160, and displays the second application screen 340 on the second electronic device 200. Before the second application screen 340 is displayed, a preset screen, such as a guidance screen, a blank screen or the like, or an entire screen or a part of the entire screen of the first electronic device 100 may be displayed on the display unit area 330 of the sharing screen 320. The preset screen such as the guidance screen may be provided to reduce a performance load of the first electronic device. Accordingly, the preset screen such as the guidance screen may be selectively provided, and an entire screen or a part of the entire screen of the first electronic device 100 may be displayed on the display unit area 330 of the sharing screen 320 even before the second application screen 340 is displayed.

Figure 4:
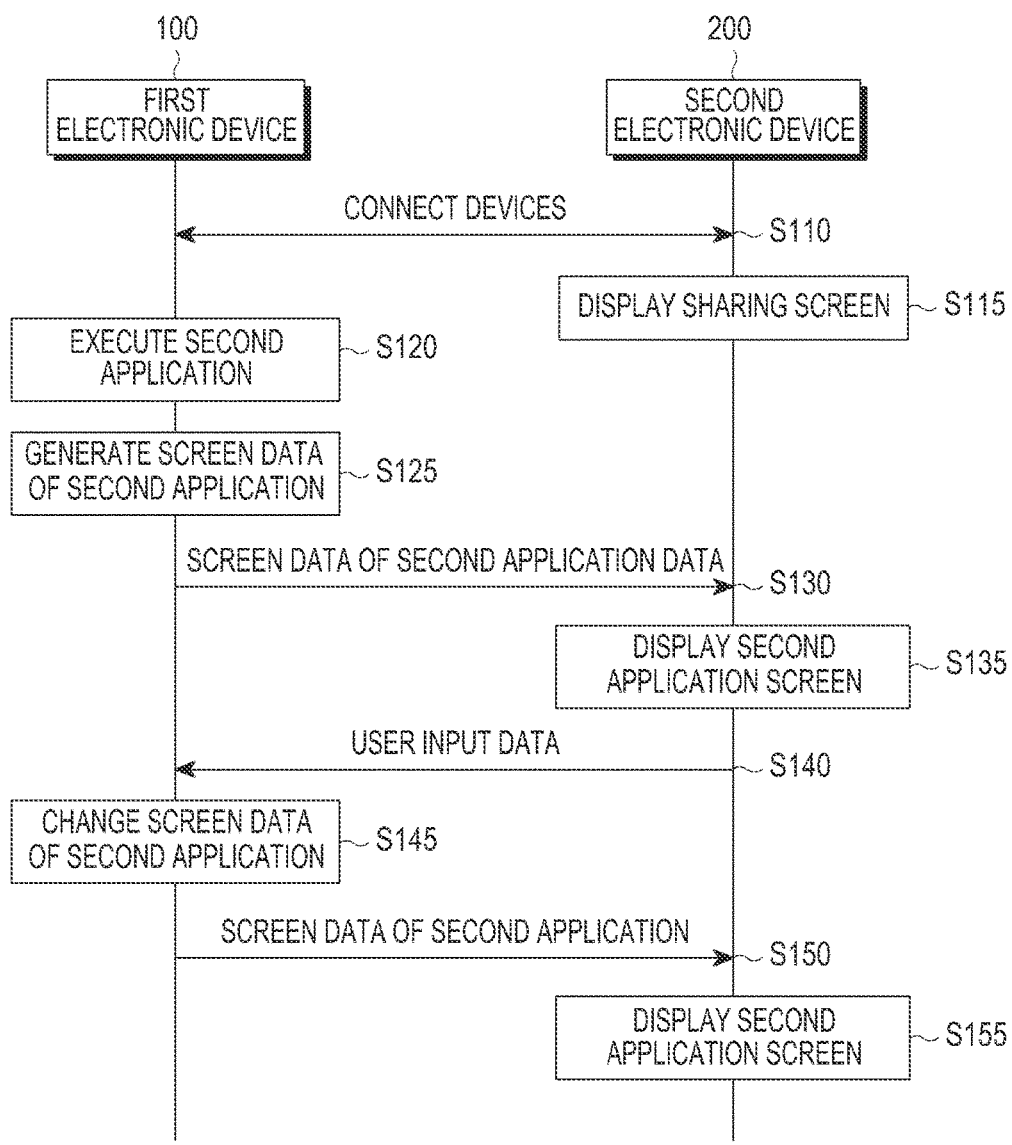
FIG. 4 is a view describing the multi display method according to still another embodiment of the present disclosure.
Figure 5:
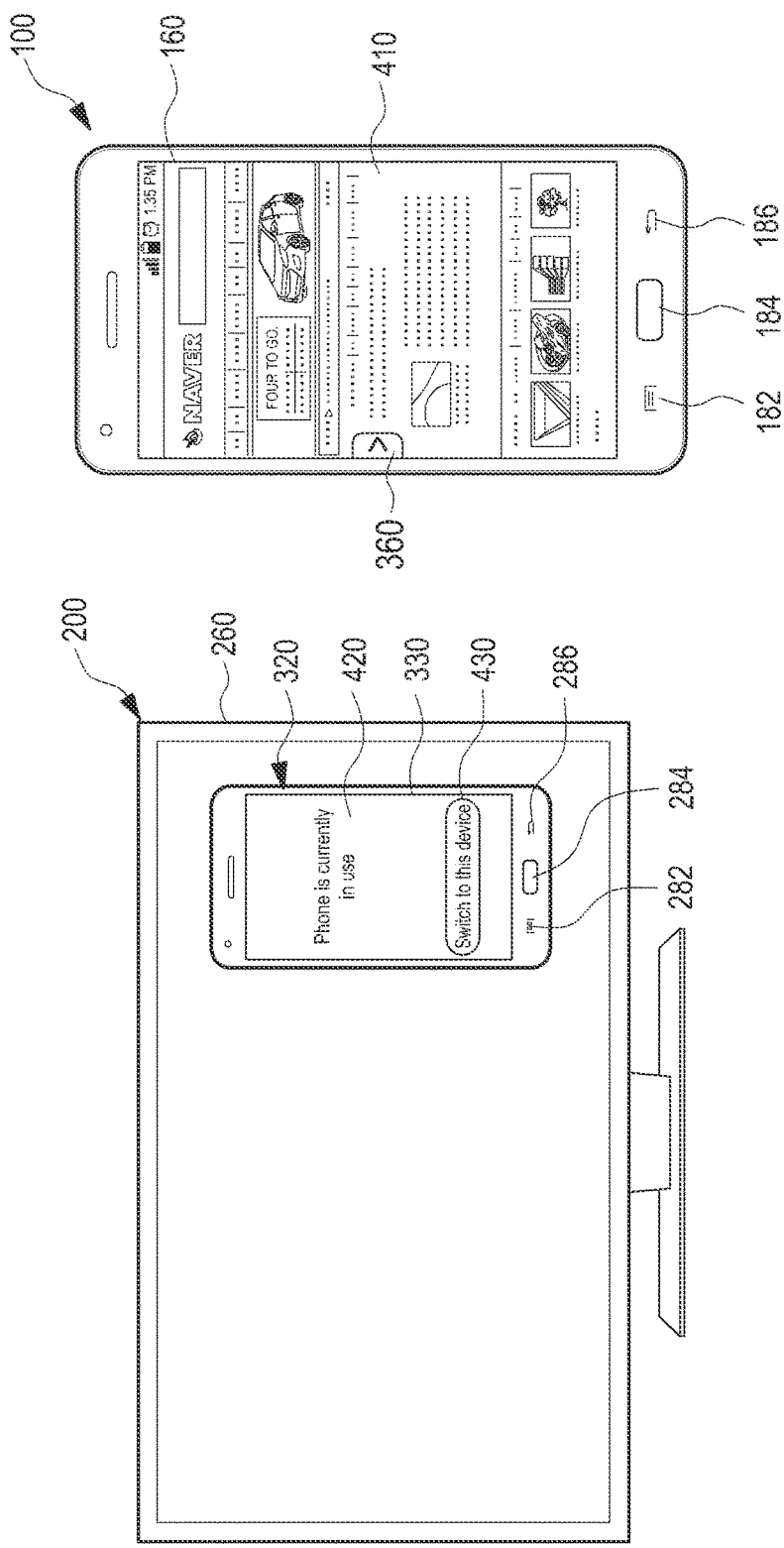
FIG. 5 is a view describing a sharing screen displaying process according to an embodiment of the present disclosure.
Figure 6:
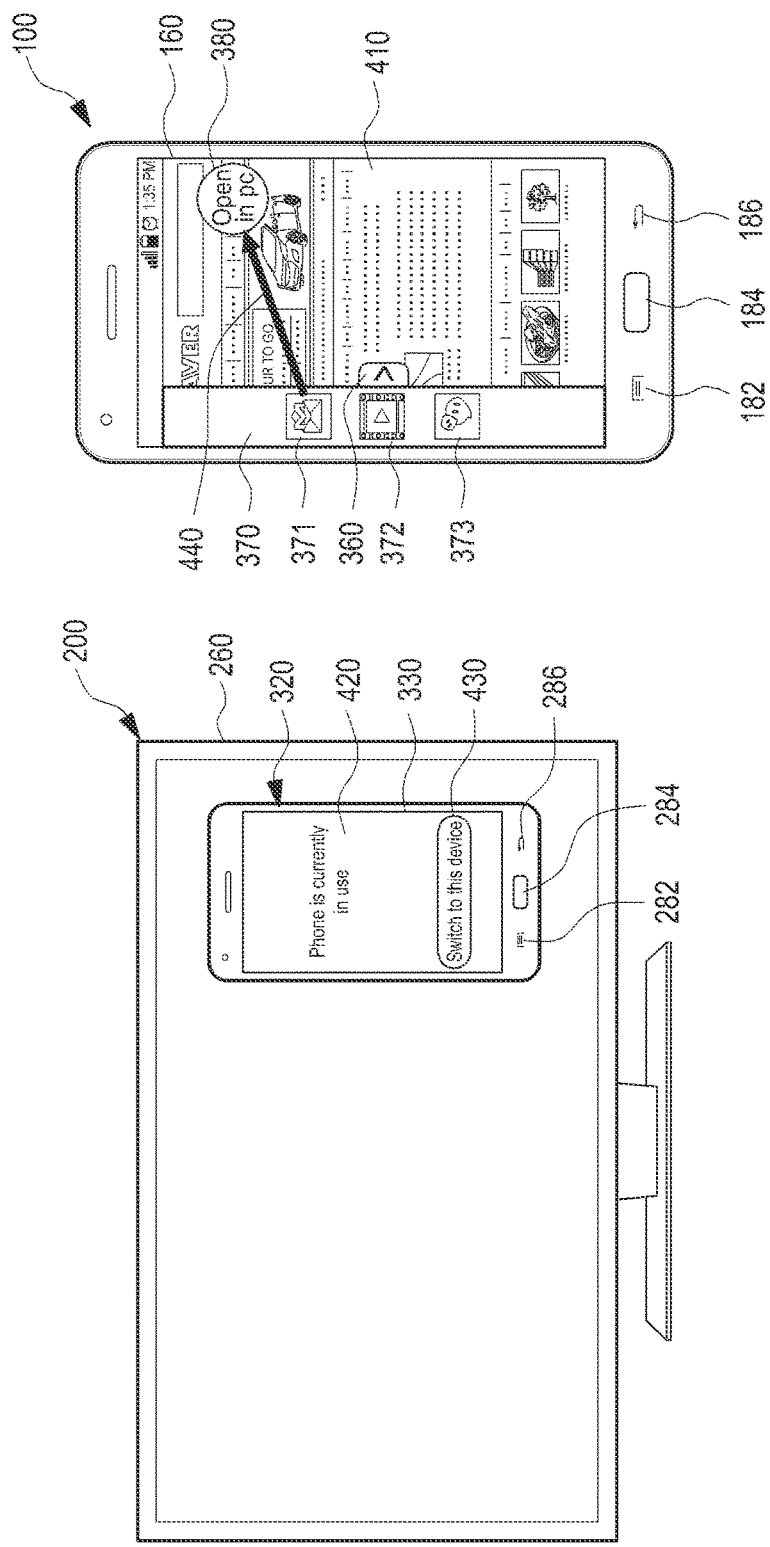
FIG. 6 is a view describing a second application executing process according to an embodiment of the present disclosure.
Figure 7:
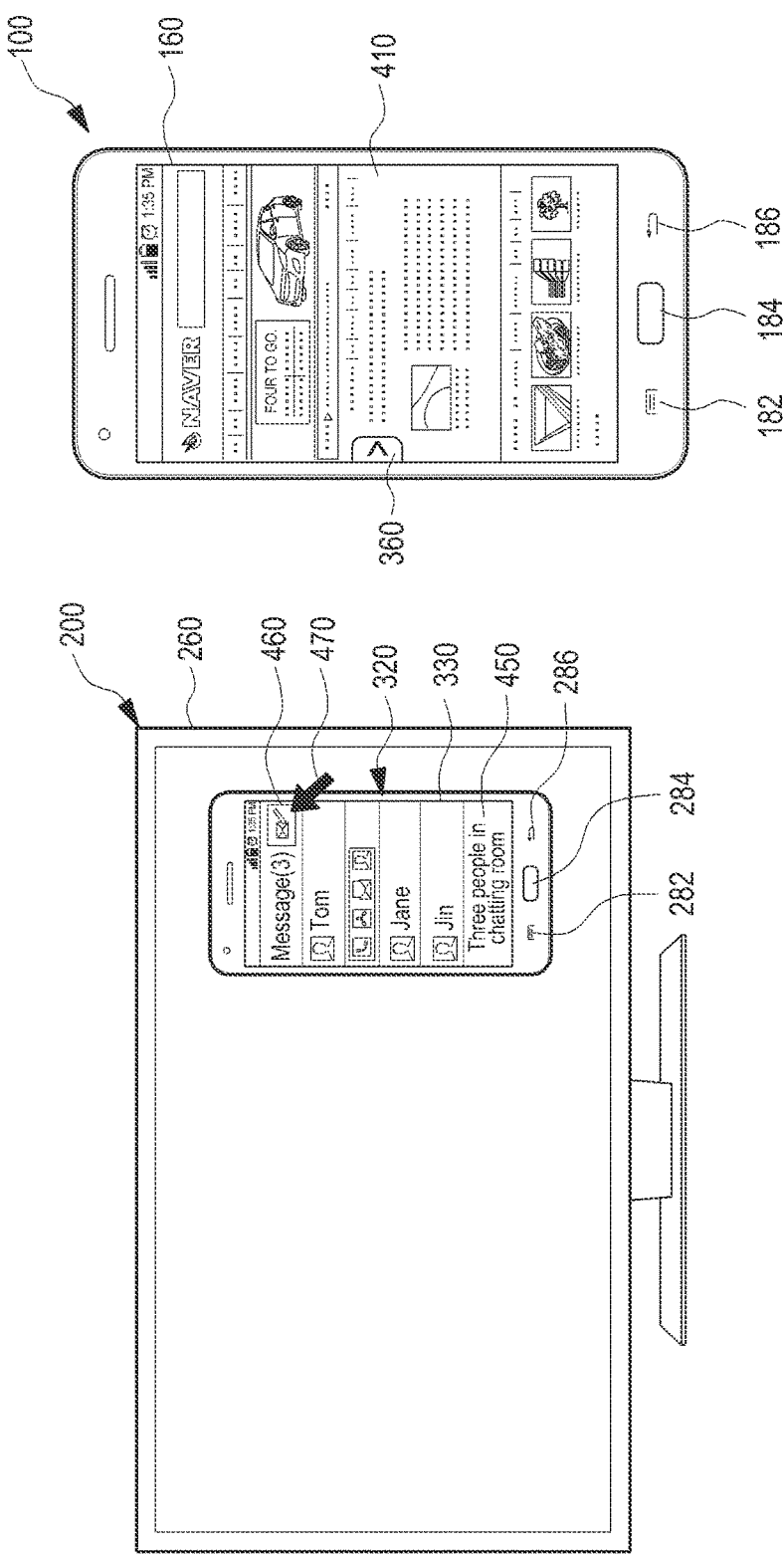
FIG. 7 is a view describing a second application displaying process according to an embodiment of the present disclosure.

FIG. 4 is a view describing the multi display method according to still another embodiment of the present disclosure. FIG. 5 is a view describing a sharing screen displaying process according to an embodiment of the present disclosure. FIG. 6 is a view describing a second application executing process according to an embodiment of the present disclosure. FIG. 7 is a view describing a second application executing process according to an embodiment of the present disclosure.

Referring to FIG. 4, FIG. 5, FIG. 6, and FIG. 7, the multi display providing method includes operations S110 to S155.

Before operation S110, the first electronic device 100 displays a first application screen. In the present embodiment, the first application screen is an Internet application.

Operation S110 is a device connection process in which the first electronic device 100 and the second electronic device 200 establish a wireless connection by using the first and second communication units 150 and 250 or a wired connection by using the first and second input/output modules 110 and 210.

The wireless connection may be established using a wireless communication protocol such as WiFi (Wireless Fidelity) (802.11x), infrared ray, ZIGBEE, Near Field Communication (NFC), a Radio Frequency Identification (RFID), BLUETOOTH, or UltraWideBand (UWB). The initiation of the device connection may be made by an automatic device search by each of the first electronic device 100 and the second electronic device 200, or by executing one or all of multiple display applications equally installed in the first electronic device 100 and the second electronic device 200. The user may select a source device and a sink device through the multiple display applications.

The first electronic device 100 may receive attribute information such as a size, a shape, and/or a resolution of the second display unit 260, the sharing screen 320, and/or the display unit area 330 and device information such as a model name and/or a unique identification of the second electronic device 200 from the second electronic device 200 through the first communication unit 150 in order to configure screen data. The first electronic device 100 may identify which type the second electronic device 200 is, which display unit the second electronic device 200 includes, or which sharing screen the second electronic device 200 provides, through the device information.

Alternatively, the second electronic device 200 may receive a resolution or a size of the first display unit 160 and/or the application screen and device information such as a model name and/or a unique identification of the first electronic device 100 from the first electronic device 100 through the second communication unit 250 in order to configure the sharing screen. The second electronic device 200 may identify which type the first electronic device 100 is, which display unit the first electronic device 100 includes, or which application screen the first electronic device 100 provides, through the device information.

Operation S115 is a sharing screen displaying process in which the second electronic device 200 displays a sharing screen having a guidance screen or a blank screen. Unlike the present embodiment, the second electronic device 200 may display the sharing screen in operation S135 of displaying the second application screen or another process.

Referring to FIG. 5, the first electronic device 100 displays a first application screen 410 corresponding to an Internet screen according to an execution of a first application corresponding to an Internet application. The first display unit 160 displays a panel handle 360 for displaying a multi window panel.

According to a user's selection or an automatic configuration, the second electronic device 200 displays the sharing screen 320 and a guidance screen 420 is displayed on the display unit area 330 of the sharing screen 320. For example, the user may select an icon of the home screen displayed on another area which is not the display unit area 330 in the second display unit 260 and execute a multi display application or the second electronic device 200 may automatically execute the multi display application according to a device connection with the first electronic device 100. The sharing screen is displayed according to the execution of the multi display application.

The guidance screen 420 includes a guidance text of "Phone is currently in use" and a button 430 for displaying the screen of the first electronic device 100. When the second electronic device 200 detects the button 430 selected by the user, the second electronic device 200 may display the screen of the first electronic device 100 on the display unit area 330.

Operation S120 is a second application executing process in which the first electronic device 100 executes a second application corresponding to a message application according to a user's selection or an automatic configuration. For example, the user may select an icon of the home screen or an icon of the multi window panel displayed on the first display unit 160 and execute the second application or the first electronic device 100 may automatically execute the multi display application according to a device connection with the second electronic device 200.

The first electronic device 100 may control the second application to configure the second application screen by using device information of the second electronic device 200, not device information of the first electronic device 100. That is, the first electronic device 100 may control to the first application to configure the first application screen by using the device information of the first electronic device 100 and the second application to configure the second application screen by using the device information of the second electronic device 200. The first electronic device 100 configures device information of the environment setting which is referred to in order to configure the application screen by each application as device information of the electronic device to display the application screen, so as to allow preloaded applications such as a launcher, a browser, and the like and most third party applications to be applied to the multi display method without a change of the application.

Further, when the second application is configured to directly identify the electronic device to display the application and configure the application screen suitable for device information of the identified electronic device, the first electronic device 100 directly uses the application screen generated by the second application, and a sub application such as a writing input application, a text input application, and/or the like used for the second application may be displayed on the first electronic device 100.

Referring to FIG. 6, when the user selects the panel handle 360, the first electronic device 100 displays a multi window panel 370 and the multi window panel 370 may include a plurality of icons 371, 372, and 373. The first electronic device 100 displays a first icon 380 for displaying the second application selected by the user on the second electronic device 200 on the first display unit 160.

For example, the user selects a second icon 371 for executing the second application from the plurality of icons within the multi window panel 370, and a user input 440 drags and drops the selected second icon 371 on the first icon 380. Unlike the present embodiment, the user drags the selected second icon 371 to place the second icon 371 on an edge of the first display unit 160 for a predetermined time, so as to instruct multiple display of the second application.

The first electronic device 100 executes the second application according to a selection of the second icon 371. The first electronic device 100 may execute the second application in the background so as not to display the second application to the user through the first display unit 160.

Operation S125 is a second application screen data generating process in which the first electronic device 100 generates second application screen data indicating the second application screen. The first electronic device 100 may generate the second application screen data in accordance with attribute information such as a size, a shape, and/or a resolution of the second display unit 260, the sharing screen 320, and/or the display unit area 330 received from the second electronic device 200, and device information such as a model name and/or an unique identification of the second electronic device 200, and transmit the generated second application screen data to the second electronic device 200. The second application screen data refers to predetermined data which can configure a screen and may be image data, text data, application data, and/or the like. For example, the first electronic device 100 may transmit information by which the second application can be identified to the second electronic device 200 and the second electronic device 200 may execute the second application installed in the second electronic device 200. For example, the second application screen data may be a raster or bitmap image of the second application screen.

Operation S130 is a second application screen data transmitting process in which the first electronic device 100 transmits the generated second application screen data to the second electronic device 200 through the first communication unit 150.

Operation S135 is a second application screen displaying process in which the second electronic device 200 generates the second application screen based on the second application screen data received through the second communication unit 250 and displays the generated second application screen on the display unit area of the sharing screen.

Referring to FIG. 7, the second electronic device 200 generates a second application screen based on second application screen data received through the second communication unit 250 and displays the generated second application screen 450 on the display unit area 330 of the sharing screen 320.

The user may perform a user input such as selecting an object of the second application screen 450. For example, the user may select identification of a received message, writing of a message or the like. The second electronic device 200 may receive the user input through the second input/output module 210, the second sensor unit 230, the second camera 240, the second communication unit 250, or the second display unit 260. The user may select a button, an icon, or a menu item through the second input/output module 210 or the second display unit 260, input a voice command through a microphone of the second input/output module 210, perform a gesture or motion input through the second camera 240, or wirelessly input a command of the second application through the second communication unit 250.

In the present embodiment, the user selects a message writing button 460 of the second application screen. The user may select the message writing button by a control input 470 of a cursor through a touch input on the second display unit 260 or the second input/output module 210 (for example, the keyboard 212 or the mouse 214 illustrated in FIG. 2).

Operation S140 is a user input data receiving process in which the second electronic device 200 detects a user input and transmits generated user input data to the first electronic device 100 through the second communication unit 250, and the first electronic device 100 receives the user input data from the second electronic device 200 through the first communication unit 150. The user input data may include information on selecting, executing, deleting, canceling, storing, or changing an object of the second application screen 450 and/or attribute change information such as a size, a shape, and/or a resolution of the sharing screen 320 or the display unit area 330.

Operation S145 is a second application screen data changing process in which the first electronic device 100 changes the second application screen data based on the received user input data. In the present embodiment, the first electronic device 100 recognizes the selection of the message writing button from the user input data and changes the second application screen data to display the message writing screen.

Operation S150 is a second application screen data transmitting process in which the first electronic device 100 transmits the changed second application screen data to the second electronic device 200 through the first communication unit 150.

Operation S155 is a process of displaying the changed second application screen in which the second electronic device 200 changes and displays the second application screen based on the changed second application screen data received through the second communication unit 250.

Figure 8:
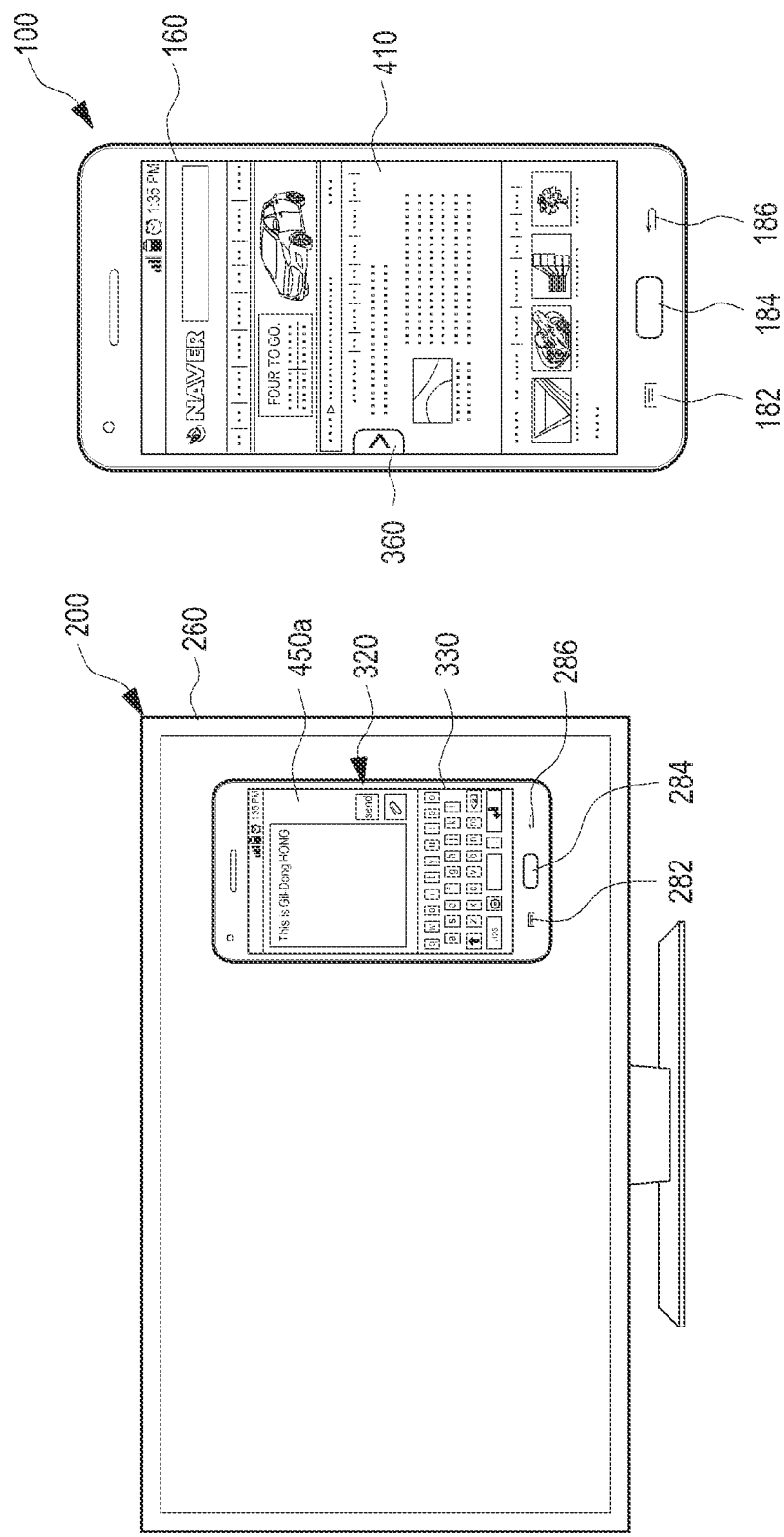
FIG. 8 is a view describing a process of displaying a changed second application screen according to an embodiment of the present disclosure.

FIG. 8 is a view describing the process of displaying the changed second application screen according to an embodiment of the present disclosure.

The second electronic device 200 changes and displays the second application screen based on the changed second application screen data received through the second communication unit 250.

In the present embodiment, the second electronic device 200 changes the message receiving screen 450 illustrated in FIG. 7 to a message writing screen 450*a* and displays the message writing screen 450*a*.

A case where one application screen is displayed on the first display unit 160 has been described with reference to FIGS. 5 to 8, and a case where a plurality of application screens are displayed on the first display unit 160 (that is, in a case of a multi window environment) will be described below.

Figure 9:
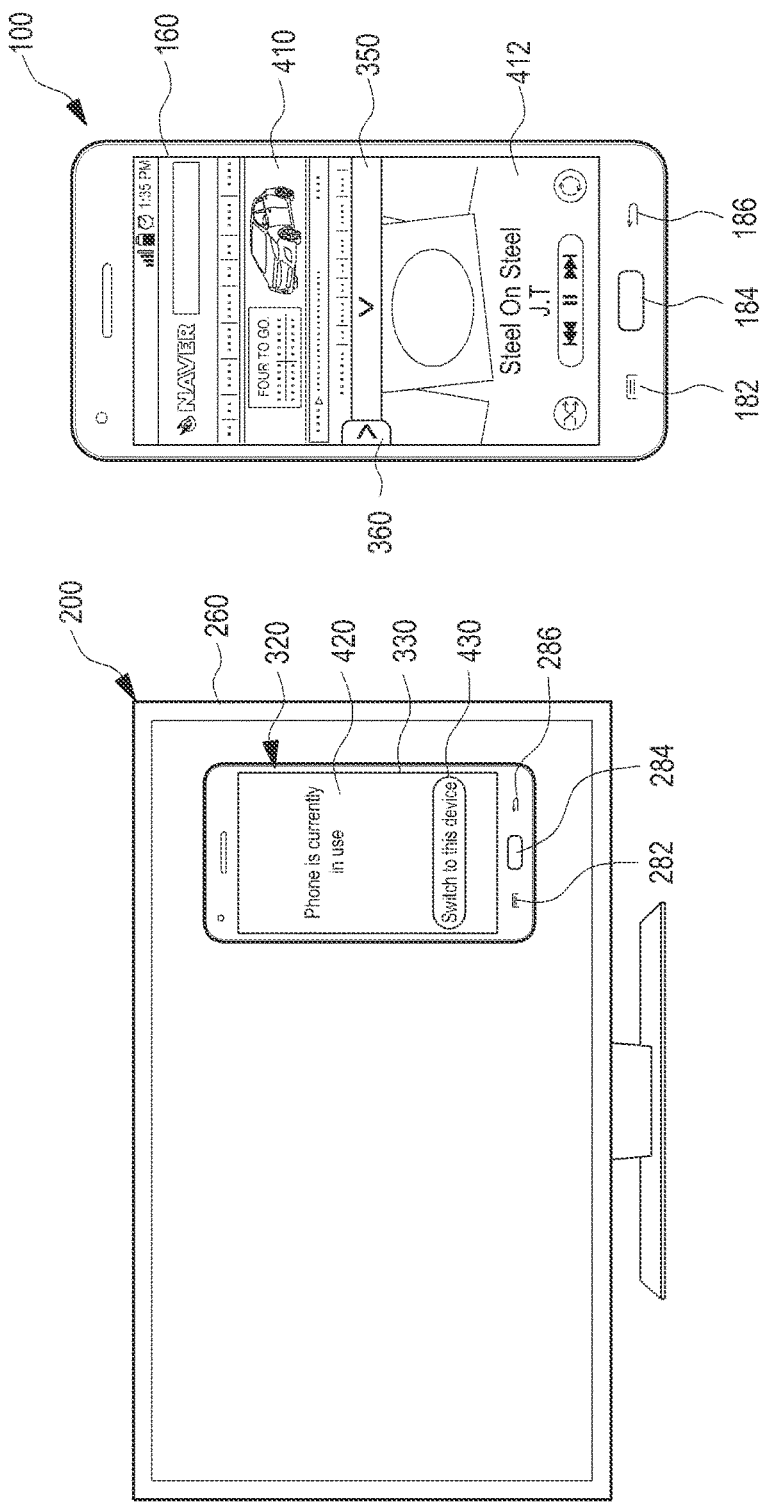
FIGS. 9 and 10 are views describing examples of a multi display method in a multi window environment according to an embodiment of the present disclosure.
Figure 10:
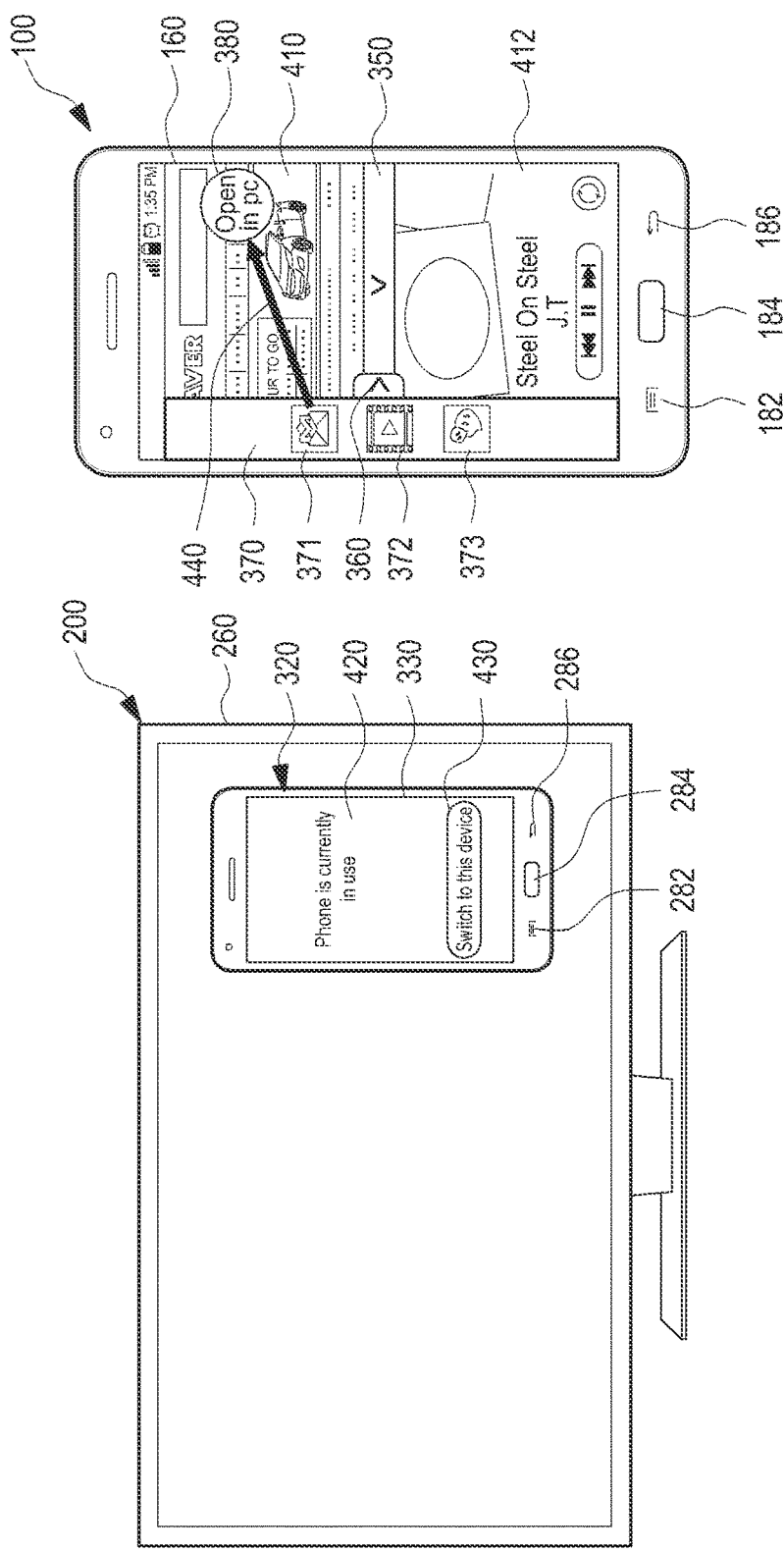

FIGS. 9 and 10 are views describing examples of the multi display method in a multi window environment according to an embodiment of the present disclosure.

Referring to FIG. 9, the first electronic device 100 displays the first application screen 410 corresponding to the Internet screen on the upper area of the first display unit 160 according to the execution of the first application corresponding to the Internet application and displays a third application screen 412 corresponding to a music application screen on a lower area of the first display unit according to an execution of the third application corresponding to the music application. The first electronic device 100 displays first and third applications 410 and 412 such that the first and third applications are separated by a partition bar 350. Further, the first display unit 160 displays the panel handle 360 for displaying a multi window panel.

According to a user's selection or an automatic configuration, the second electronic device 200 displays the sharing screen 320 and the guidance screen 420 is displayed on the display unit area 330 of the sharing screen 320. For example, the user may select an icon of the home screen displayed on the second display unit 260 and execute a multi display application or the second electronic device 200 may automatically execute the multi display application according to a device connection with the first electronic device 100. The sharing screen 320 is displayed according to the execution of the multi display application.

Referring to FIG. 10, the user selects the second icon 371 for executing the second application from the plurality of icons 371 to 373 within the multi window panel 370, and with an input 440 drags and drops the selected second icon 371 on the first icon 380.

The first electronic device 100 executes the second application according to the selection of the second icon 371. The first electronic device 100 may execute the second application in the background so as not to show the second application to the user through the first display unit 160.

Thereafter, the first electronic device 100 generates the second application screen data for displaying the second application screen and transmits the generated second application screen data to the second electronic device 200.

Figure 11:
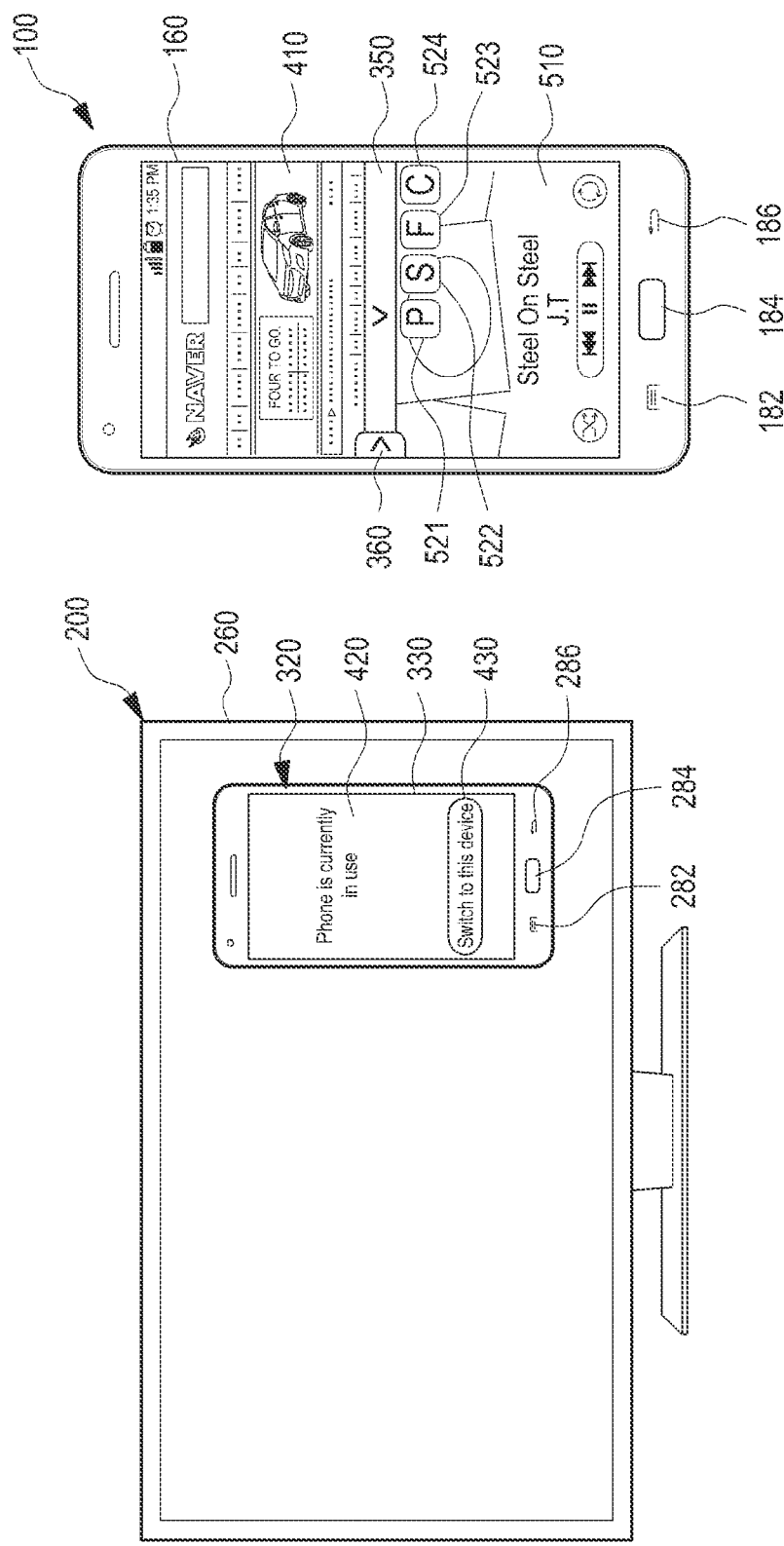
FIGS. 11 and 12 are views describing another example of the multi display method in a multi window environment according to an embodiment of the present disclosure.
Figure 12:
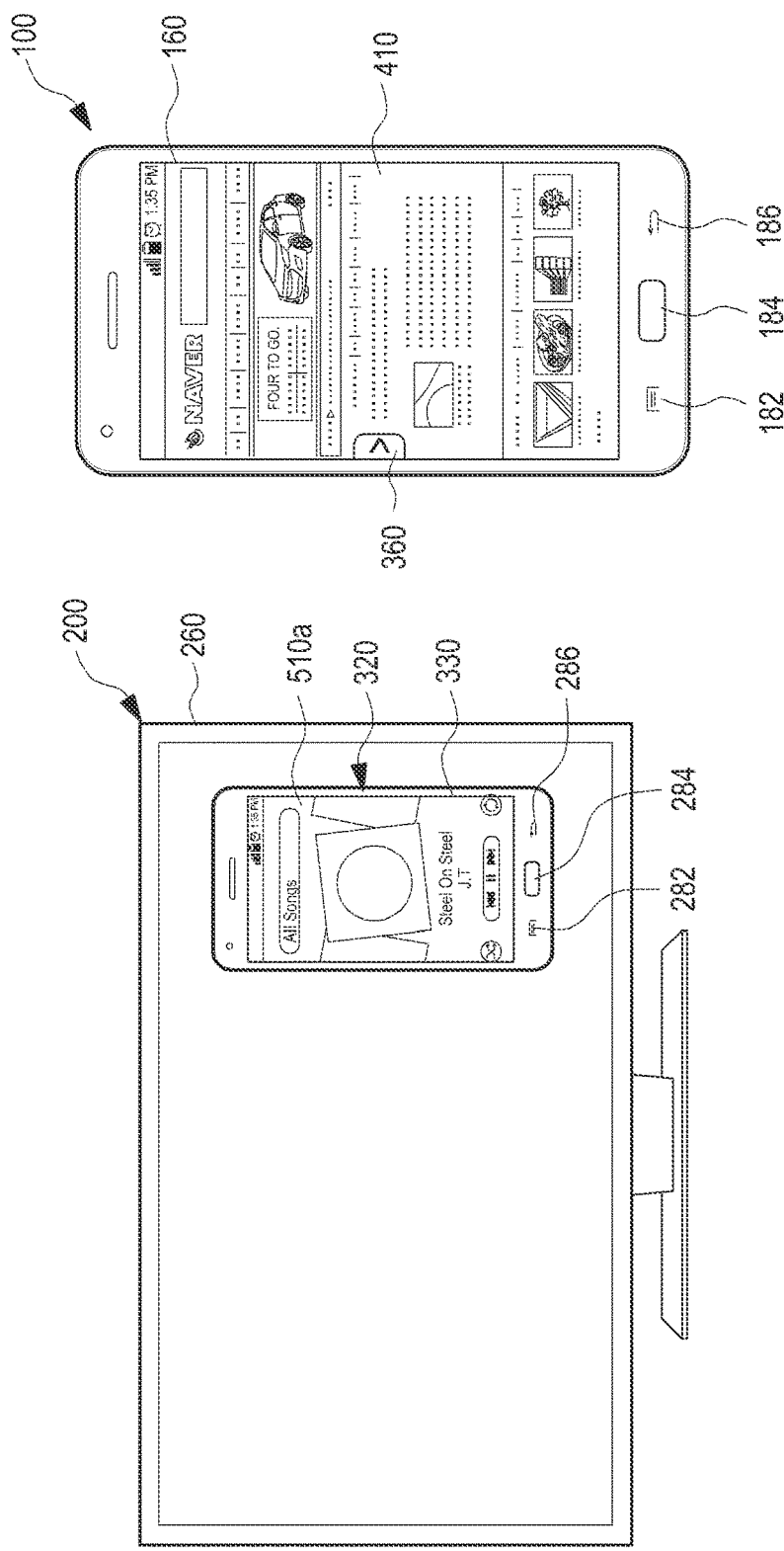

FIGS. 11 and 12 are views describing another example of the multi display method in a multi window environment according to an embodiment of the present disclosure.

Referring to FIG. 11, the first electronic device 100 displays the first application screen 410 corresponding to the Internet screen on the upper area of the first display unit 160 according to the execution of the first application corresponding to the Internet application and displays a second application screen 510 corresponding to a music application screen on a lower area of the first display unit 160 according to an execution of the second application corresponding to the music application. The first electronic device 100 displays first and second applications 410 and 510 such that the first and second applications are separated by the partition bar 350. Further, the first display unit 160 displays the panel handle 360 for displaying a multi window panel.

According to a user's selection or an automatic configuration, the second electronic device 200 displays the sharing screen 320 and the guidance screen 420 is displayed on the display unit area 330 of the sharing screen 320. For example, the user may select an icon of the home screen displayed on the second display unit 260 and execute a multi display application or the second electronic device 200 may automatically execute the multi display application according to a device connection with the first electronic device 100. The sharing screen 320 is displayed according to the execution of the multi display application.

First to fourth buttons 521, 522, 523, and 524 may be displayed on an activated or selected application screen of the first and second application screens 410 and 510. A user input can be made on an application screen in an activated state and cannot be made on an application screen in an inactive state.

In the present embodiment, the first to fourth buttons 521, 522, 523, and 524 are displayed in an overlapping manner on the second application screen 510.

The first button 521 may be a push button used to receive a user input for displaying the selected application on the second electronic device 200.

The second button 522 may be a switch button used to display the first application screen 410 displayed on the upper area of the first display unit 160 on the lower area of the first display unit 160 and to display the second application screen 510 displayed on the lower area of the first display unit 160 on the upper area of the first display unit 160. That is, the second button 522 is used to switch positions of the application screens of the multi window.

The third button 523 may be a full window button used to display the selected application on a full screen.

The fourth button 524 may be a close button used to terminate the selected application.

In the present embodiment, it is assumed the user selects the first button 521 for the second application.

Referring to FIG. 12, when the user selects the multi display, that is, when the user selects to display the second application on the second electronic device 200, the first electronic device 100 stops displaying the second application screen displayed on the lower area of the first display unit 160 and expands the first application screen 410 displayed on the upper area of the first display unit 160 such that the first application screen 410 is expanded to the lower area of the first display unit 160. Further, the first electronic device 100 transmits second application screen data for displaying the second application screen to the second electronic device 200.

The second electronic device 200 generates the second application screen based on the second application screen data received through the second communication unit 250 and displays the generated second application screen 510a on the display unit area 330 of the sharing screen 320.

Figure 13:
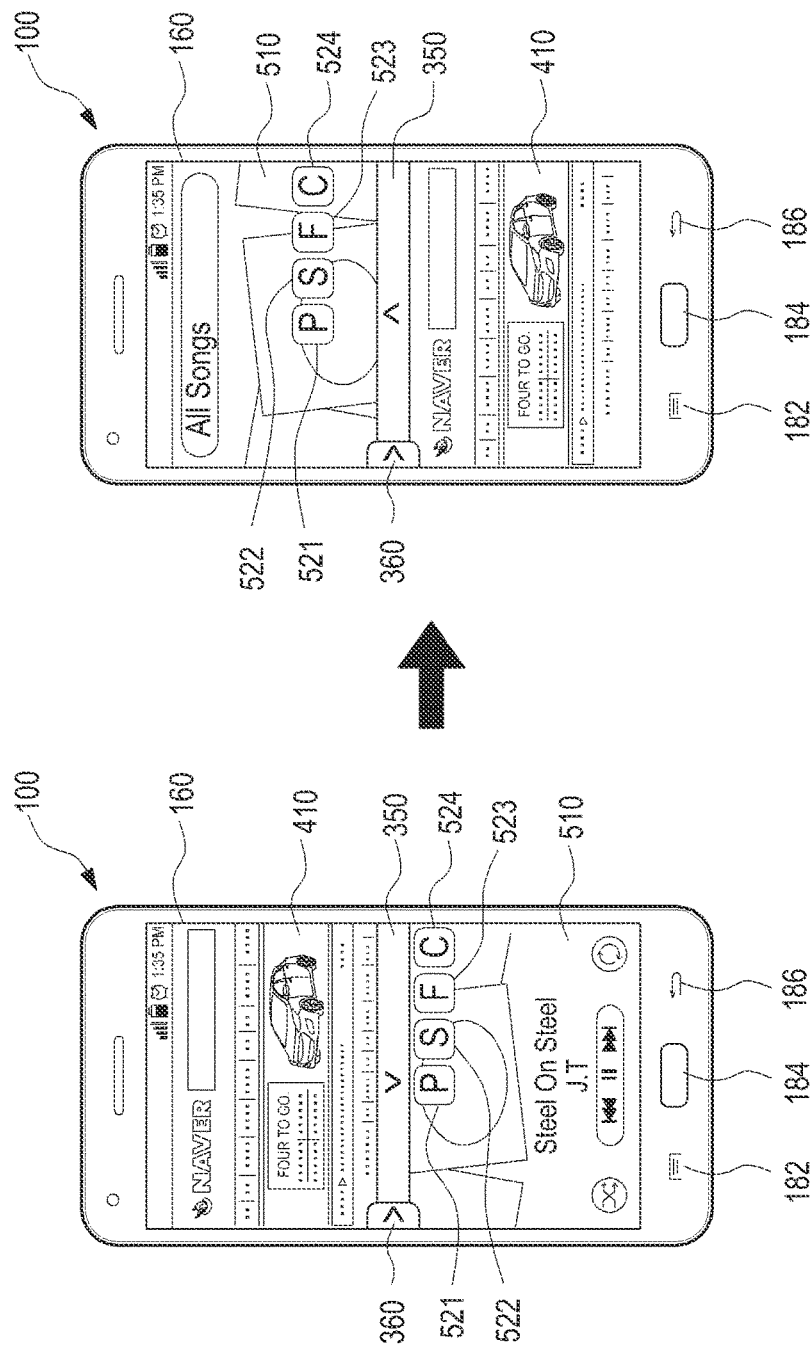
FIGS. 13A and 13B are views describing screen switching in a multi window.

FIGS. 13A and 13B are views describing screen switching in the multi window according to an embodiment of the present disclosure.

Referring to FIG. 13A, the first electronic device 100 displays the first application screen 410 corresponding to the Internet screen on the upper area of the first display unit 160 according to the execution of the first application corresponding to the Internet application and displays the second application screen 510 corresponding to the music application screen on the lower area of the first display unit 160 according to the execution of the second application corresponding to the music application.

In the present embodiment, it is assumed the user selects the second button 522 for the selected second application.

Referring to FIG. 13B, as the selection of the second button 522 is detected, the first electronic device 100 displays the first application screen 410 displayed on the upper area of the first display unit 160 on the lower area of the first display unit 160 and displays the second application screen 510 displayed on the lower area of the first display unit 160 on the upper area of the first display unit 160.

Figure 14:
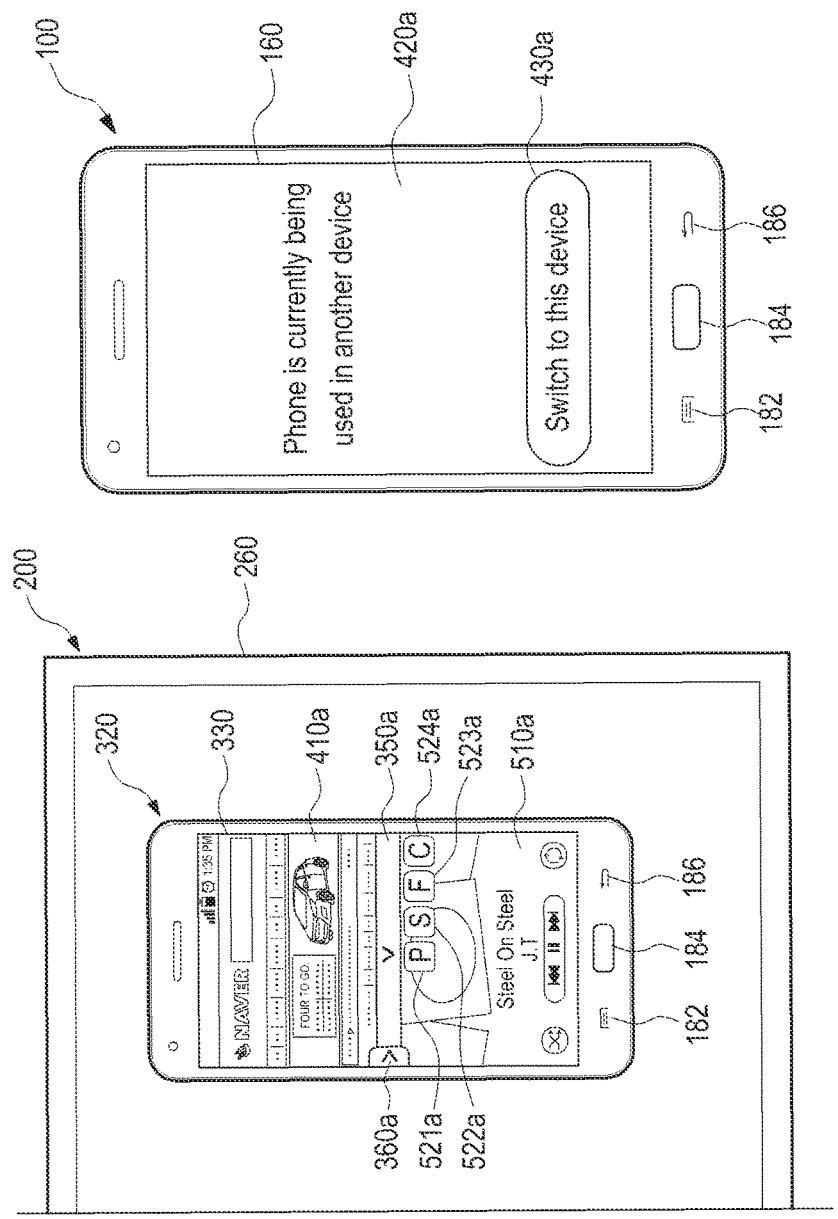
FIGS. 14 and 15 are views describing another example of the multi display method in the multi window environment according to an embodiment of the present disclosure.
Figure 15:
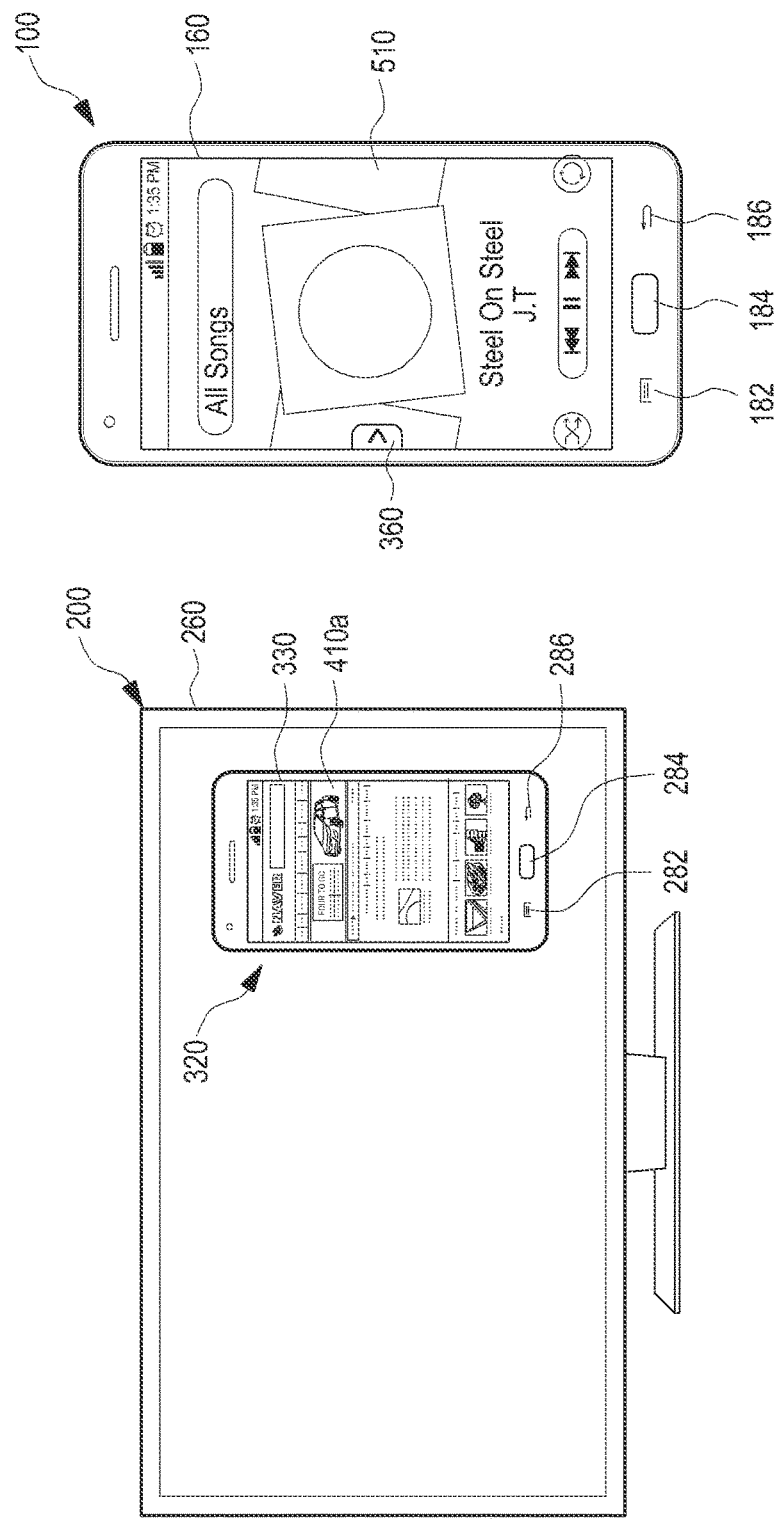

FIGS. 14 and 15 are views describing another example of the multi display method in a multi window environment.

Referring to FIG. 14, the first electronic device 100 executes the first application corresponding to the Internet application and the second application corresponding to the music application, generates first and second application data according to a user's request or an automatic configuration, and transmits the generated first and second application data to the second electronic device 200.

The first electronic device 100 displays a guidance screen 420a. The guidance screen 420a includes a guidance text of "Phone is currently being used in another device" and a button 430a for displaying the screen of the first electronic device 100. When the first electronic device 100 detects the button 430a selected by the user, the first electronic device 100 may display the first and second application screens on the first display unit 160.

The second electronic device 200 generates the first and second application screens based on the first and second application screen data received through the second communication unit 250 and displays the generated first and second application screens 410a and 510a on the display unit area 330 of the sharing screen 320.

The second electronic device 200 displays the first application screen 410a corresponding to the Internet application screen on the upper area of the display unit area 330 and displays the second application screen 510a corresponding to the music application screen on the lower area of the display unit area 330. The first and second application screens 410a and 510a are separately displayed by a partition bar 350a. Further, a panel handle 360a for displaying the multi window panel is displayed on the display unit area 330 and first to fourth buttons 521a, 522a, 523a, and 524a are displayed on the second application screen 510a.

In the present embodiment, it is assumed the user selects the first button 521a for the second application.

Referring to FIG. 15, when the user selects the multi display through the first button 521a, that is, when the user selects to display the first application on the second electronic device 200 and the second application on the first electronic device 100, the second electronic device 200 stops displaying the second application screen displayed on the lower area of the display unit area 330 and expands the first application screen 410a displayed on the upper area of the display unit area 330 such that the first application screen 410a is expanded to the lower area of the display unit area 330.

The first electronic device 100 displays the second application screen 510 on the first display unit 160.

Figure 16:
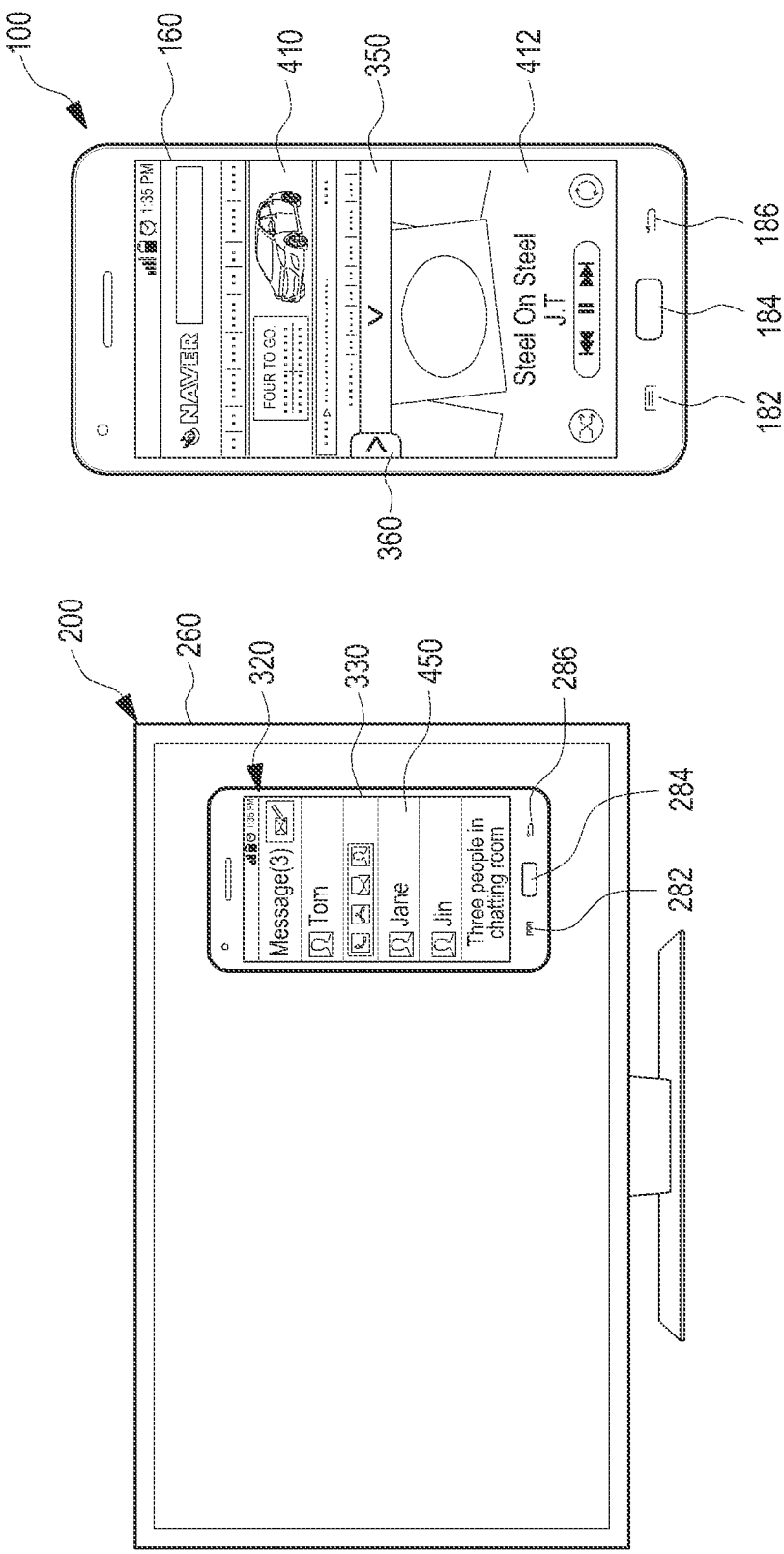
FIGS. 16, 17, and 18 are views describing examples of the multi display method according to an embodiment of the present disclosure.
Figure 17:
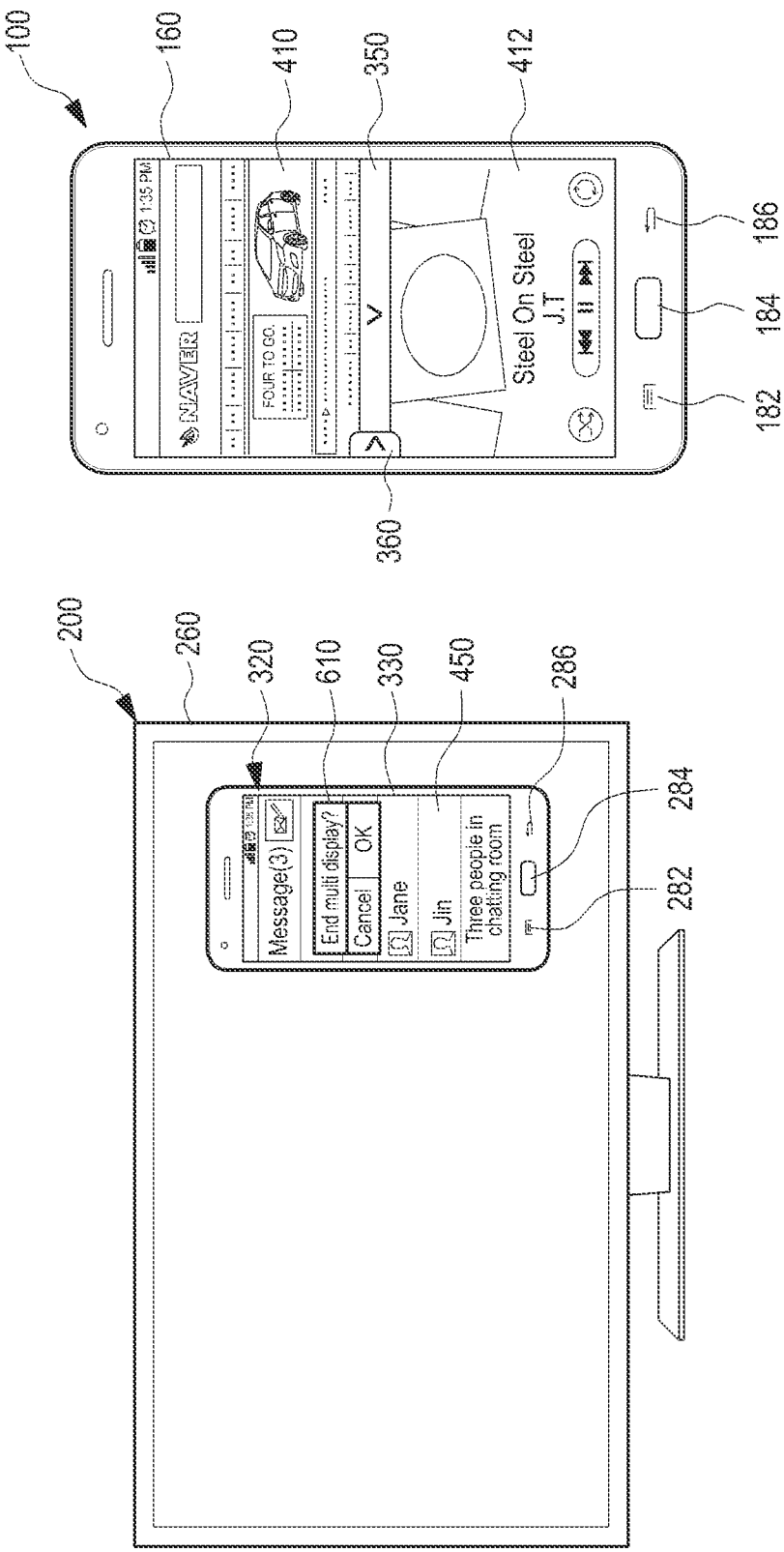
Figure 18:
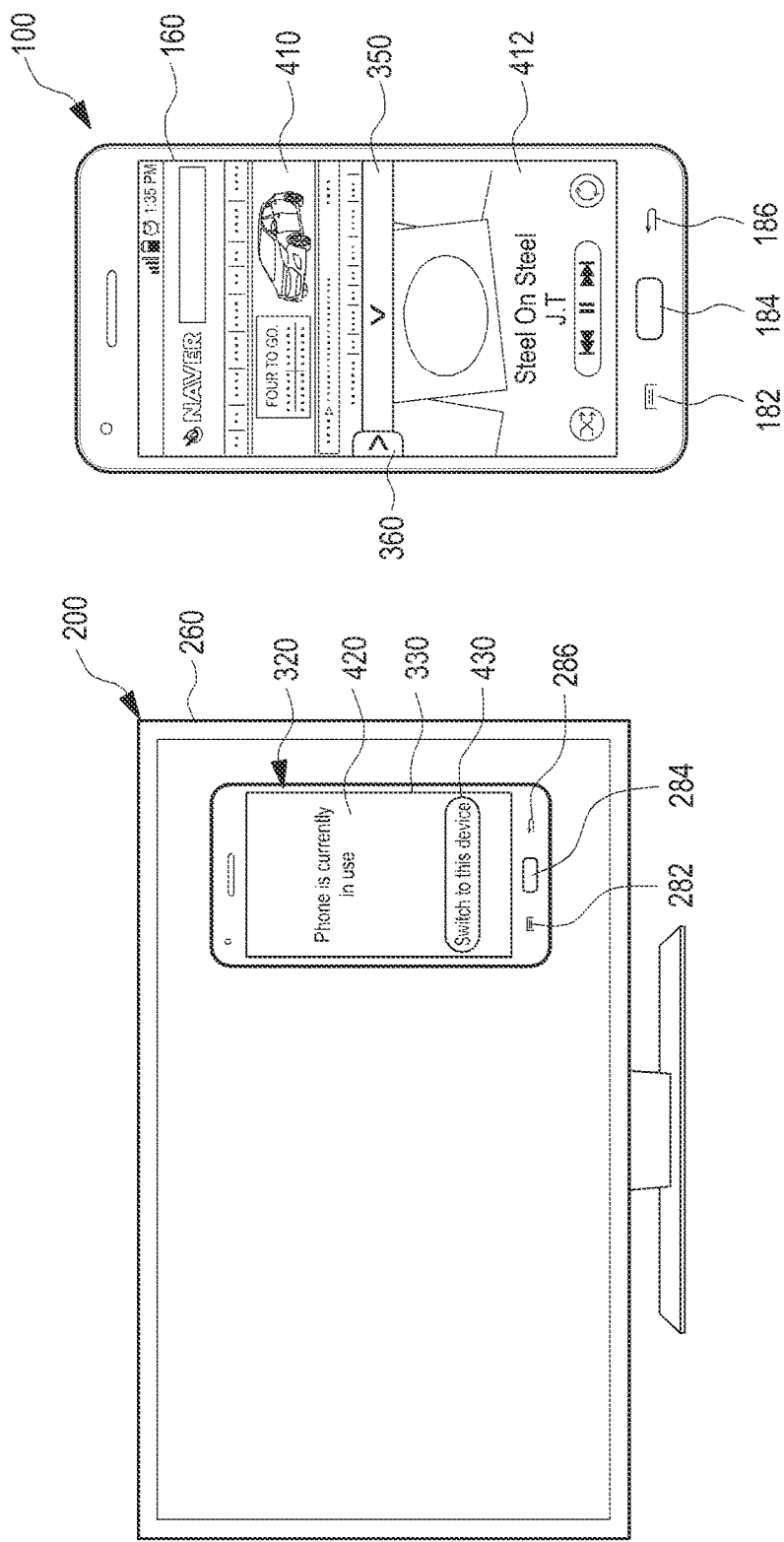

FIGS. 16, 17, and 18 are views describing examples of the multi display method according to an embodiment of the present disclosure.

Referring to FIG. 16, the first electronic device 100 displays the first application screen 410 corresponding to the Internet screen and the third application screen 412 corresponding to the music application screen. The second electronic device 200 displays the second application screen 450 corresponding to the message application.

In order to end the multi display, the user may select the second back key 286 displayed on the second electronic device 200 one or more times.

Referring to FIG. 17, the second electronic device 200 may display a window 610 for identifying the end of the multi display and the user may select an "OK" button to end the multi display, or may select a "cancel" button to cancel the end of the multi display.

In the present embodiment, it is assumed the user selects the "OK" button.

Referring to FIG. 18, when the multi display ends, the guidance screen 420 may be displayed on the display unit area 330 of the sharing screen 320.

Figure 19:
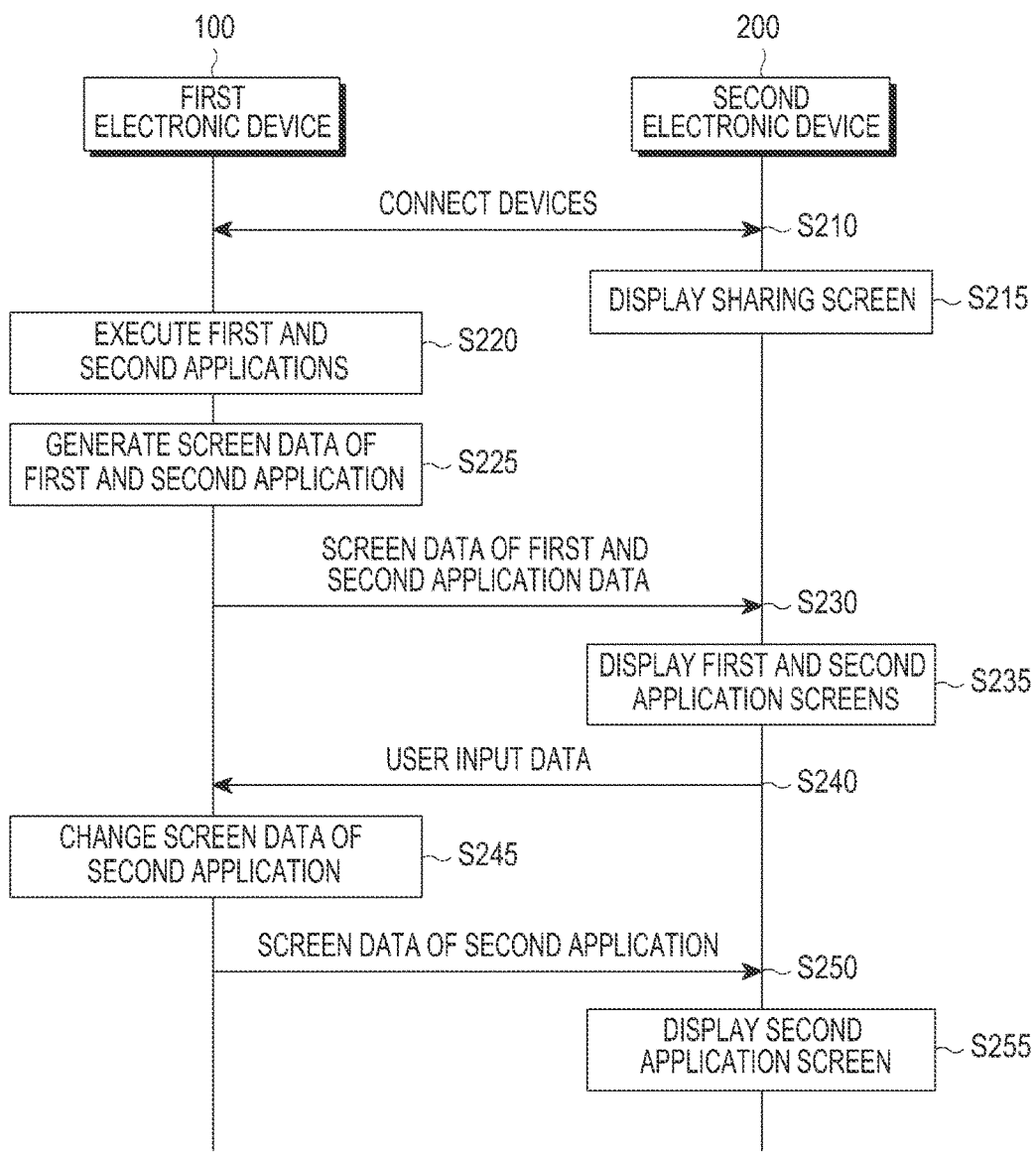
FIG. 19 is a view describing the multi display method according to yet another embodiment of the present disclosure according to an embodiment of the present disclosure.

FIG. 19 is a view describing the multi display method according to yet another embodiment of the present disclosure.

The multi display providing method includes operations S210 to S255.

Operation S210 is a device connection process in which the first electronic device 100 and the second electronic device 200 establish a wireless connection by using the first and second communication units 150 and 250 or a wired connection by using the first and second input/output modules 110 and 210.

Operation S215 is a sharing screen displaying process in which the second electronic device 200 displays a sharing screen having a guidance screen or a blank screen.

Operation S220 is a first and second application executing process in which the first electronic device 100 executes the first application, e.g., the Internet application, and the second application, e.g., the music application, according to a user's selection or an automatic configuration. Unlike the present embodiment, the first application may have been being executed before establishing the device connection.

Operation S225 is a first and second application screen data generating process in which the first electronic device 100 generates the first application screen data displaying the first screen and the second application screen data displaying the second application screen.

Operation S230 is a first and second application screen data transmitting process in which the first electronic device 100 transmits the generated first and second application screen data to the second electronic device 200 through the first communication unit 150.

Operation S235 is a first and second application screen displaying process in which the second electronic device 200 generates the first and second application screens based on the first and second application screen data received through the second communication unit 250 and displays the generated first and second application screens on the display unit area of the sharing screen.

Operation S240 is a user input data receiving process in which the second electronic device 200 detects a user input and transmits generated user input data to the first electronic device 100 through the second communication unit 250, and the first electronic device 100 receives the user input data from the second electronic device 200 through the first communication unit 150.

Operation S245 is a second application screen data changing process in which the first electronic device 100 changes the second application screen data based on the received user input data. For example, the first electronic device 100 may change the second application screen data such that the second application screen is expanded. Similarly, the first electronic device 100 may change the first application screen data such that the second application screen is expanded.

Operation S250 is a second application screen data transmitting process in which the first electronic device 100 transmits the changed second application screen data to the second electronic device 200 through the first communication unit 150.

Operation S255 is a process of displaying the changed second application screen in which the second electronic device 200 changes and displays the second application screen based on the changed second application screen data received through the second communication unit 250. Similarly, the first electronic device 100 changes the first application screen based on the changed first application screen data and displays the changed first application screen on the first display unit 160.

Figure 20:
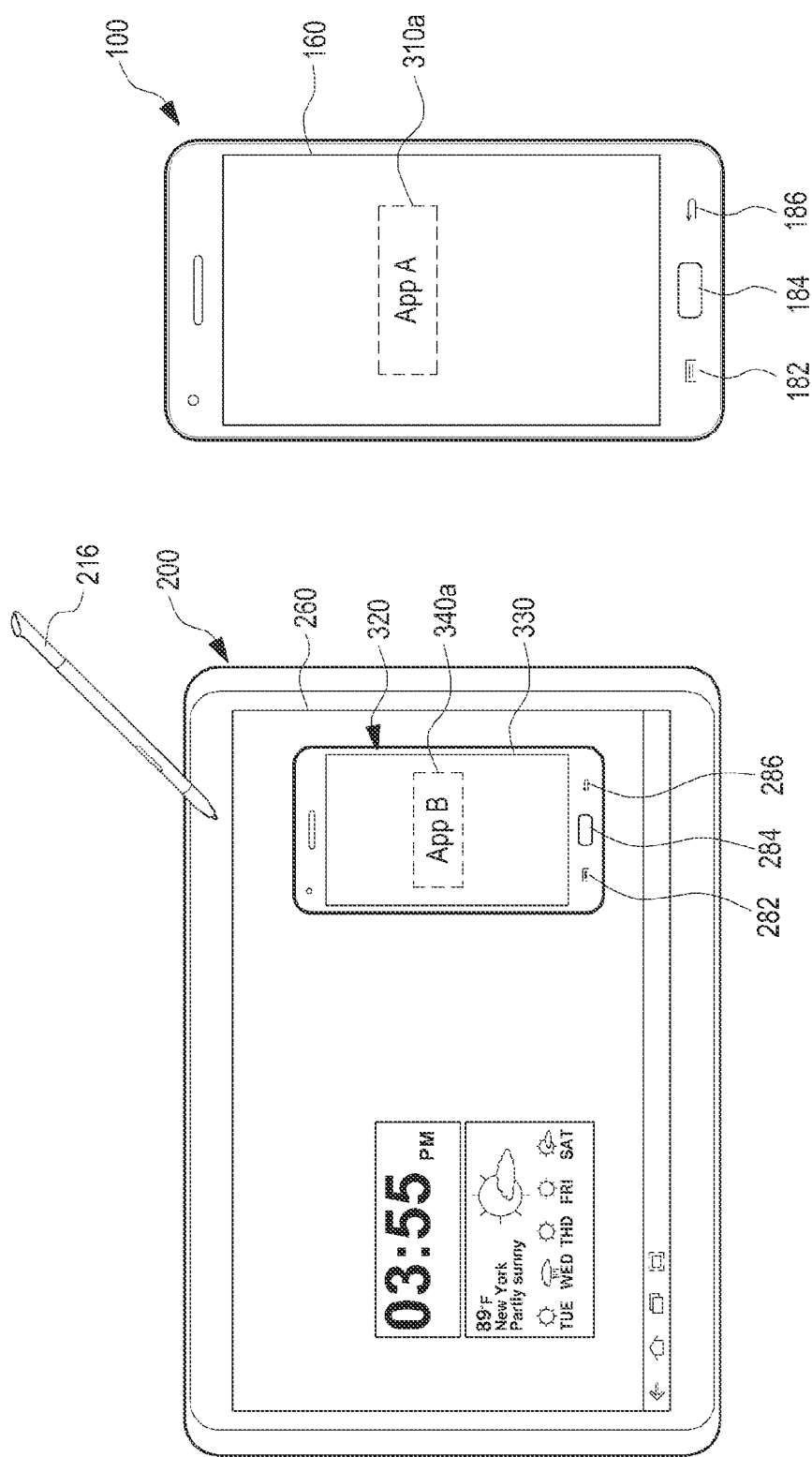
FIG. 20 is a view illustrating another example of an electronic device according to an embodiment of the present disclosure.

FIG. 20 is a view illustrating another example of the electronic device according to an embodiment of the present disclosure.

As described above, the electronic device for the multi display may be a predetermined device such as a smart phone, a mobile phone, a navigation device, a game machine, a TV, a notebook computer, a desktop computer, a tablet PC, a PMP, or a PDA, and it is assumed the second electronic device 200 corresponds to a tablet PC in the present embodiment.

The first electronic device 100 includes the first display unit 160 and the plurality of soft keys 182, 184, and 186. The first electronic device 100 displays the first application screen 310a on the first display unit 160 and transmits second application screen data to the second electronic device 200.

The second electronic device 200 may include the second display unit 260 and a pen 216 which is a part of the second input/output module. The second electronic device 200 displays the second application screen 340a configured according to the second application screen data on the display unit area 330 of the sharing screen 320. The sharing screen 320 includes the display unit area 330 and the plurality of selectable second soft keys 282, 284, and 286.

In the multi display method according to various embodiments of the present disclosure, the application to be displayed on the sharing screen may be automatically selected according to an automatic configuration. For example, according to a user's configuration stored in the first storage unit 120, an application (for example, a chatting application) registered in the user's configuration may be automatically displayed on the second electronic device 200 when the first electronic device 100 is connected to the second electronic device 200.

Further, when the first electronic device 100 is connected to the second electronic device 200 in a state where the first electronic device 100 executes a plurality of applications, the first electronic device 100 may control to display the application, which is being executed, on the second electronic device 200 by using device information of the second electronic device 200. For example, when the second electronic device 200 is a device which can receive a pen input and executes a sketch application, the first electronic device 100 may control to display a sketch application screen on the second electronic device 200.

Referring to FIG. 3, sizes of the first application screen and the second application screen may be adjusted by moving the partition bar 350 upward or downward. For example, when the user moves the partition bar upward, the size of the first application screen 310 is reduced and the size of the second application screen 340 is increased. For example, when the first electronic device 100 is connected to the second electronic device 200 in a state where the size of the first application screen 310 is larger than the size of the second application screen 340, the first electronic device 100 may control to display the second application screen on the second electronic device 200.

It may be appreciated that the various embodiments of the present disclosure may be implemented in software, hardware, or a combination thereof. For example, in the electronic device illustrated in FIG. 1, components such as the storage unit, the communication unit, and the controller may be implemented as devices, respectively. Any such software may be stored, for example, in a volatile or non-volatile storage device such as a ROM, a memory such as a RAM, a memory chip, a memory device, or a memory Integrated Circuit (IC), or a recordable optical or magnetic medium such as a Compact Disc (CD), a Digital Versatile Disc (DVD), a magnetic disk, or a magnetic tape, which are non-transitory machine (computer) readable storage media, regardless of its ability to be erased or its ability to be re-recorded. It is appreciated that the storage unit included in the electronic device is one example of hardware configured as a program including commands for implementing various embodiments of the present disclosure or a non-transitory machine-readable storage medium suitable for storing programs. Accordingly, the present disclosure includes a device configured to include a program that includes a code for implementing an apparatus or a method defined in any claim in the present specification and a non-transitory machine-readable storage medium that stores such a program. Further, the program may be electronically transferred by any communication signal through a wired or wireless connection, and the present disclosure appropriately includes non-transitory equivalents of the program.

Further, the device can receive the program from a program providing apparatus connected to the device wirelessly or through a wire and store the received program. The program providing device may include a program including instructions to instruct the electronic device to perform a method of displaying a widget, a memory storing information required for the method of displaying a widget, a communication unit to perform wired or wireless communication with the electronic device, and a controller to transmit a corresponding program to the electronic device, automatically or in response to a request from the electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A multi display method by a first electronic device, the method comprising:
   transmitting a model name of the first electronic device to a second electronic device;
   executing, by the first electronic device, a first application and a second application;
   generating, by the first electronic device, screen data of the first application and screen data of the second application;
   simultaneously displaying the screen data of the first application and the screen data of the second application on a first display of the first electronic device; and
   in response to selection of a button that has a function of displaying the screen data of the first application and the screen data of the second application on a second display of the second electronic device and that is displayed on the second display of the second electronic device without being displayed on the first electronic device, starting to transmit the screen data of the first application and the screen data of the second application displayed on the first display prior to the selection of the button to the second electronic device,
   wherein the button is included in a preset area of a first screen image displayed on the second display, the first screen image includes a representation of an appearance of the first electronic device, and the preset area includes a representation of the first display of the first electronic device.

2. The method of claim 1, wherein the screen data of the first application and the screen data of the second application are displayed as windows.

3. The method of claim 1, wherein the simultaneous displaying of the screen data of the first application and the screen data of the second application on the first display of the first electronic device is performed before the transmitting of the screen data of the first application and the screen data of the second application to the second electronic device.

4. The method of claim 1, wherein the transmitted screen data of the first application and the transmitted screen data of the second application are displayed in the preset area of the first screen image displayed on the second display.

5. The method of claim 4,
   wherein the first electronic device includes a first key disposed outside of the first display, the first screen image includes a second key corresponding to the first key, and the second key is disposed outside of the preset area, and
   wherein the first electronic device is configured to perform a predetermined function in response to selection of the second key.

6. A non-transitory machine-readable storage medium which upon execution instructs at least one processor to:
   transmit a model name of a first electronic device to a second electronic device;
   execute, by the first electronic device, a first application and a second application;
   generate, by the first electronic device, screen data of the first application and screen data of the second application;

simultaneously display the screen data of the first application and the screen data of the second application on a first display of the first electronic device; and in response to selection of a button that has a function of displaying the screen data of the first application and the screen data of the second application on a second display of the second electronic device and that is displayed on the second display of the second electronic device without being displayed on the first electronic device, start to transmit the screen data of the first application and the screen data of the second application displayed on the first display prior to the selection of the button to the second electronic device, wherein the button is included in a preset area of a first screen image displayed on the second display, the first screen image includes a representation of an appearance of the first electronic device, and the preset area includes a representation of the first display of the first electronic device.

7. The non-transitory machine-readable storage medium of claim 6, wherein the transmitted screen data of the first application and the transmitted screen data of the second application are displayed in the preset area of the first screen image displayed on the second display.

8. The non-transitory machine-readable storage medium of claim 7, wherein the first electronic device includes a first key disposed outside of the first display, the first screen image includes a second key corresponding to the first key, and the second key is disposed outside of the preset area, and wherein the first electronic device is configured to perform a predetermined function in response to selection of the second key.

9. A second electronic device for a multi display, the second electronic device comprising:

a second display;

a communication interface; and at least one processor configured to:

receive a model name of a first electronic device from the first electronic device through the communication interface, determine a screen configuration by comparing the model name received from the first electronic device with information stored at the second electronic device, generate a first screen image including a representation of an appearance of the first electronic device using the determined screen configuration, display the first screen image on the second display, the first screen image including a preset area including a representation of a first display of the first electronic device, detect selection of a button which is displayed in the preset area without being displayed on the first electronic device, in response to the selection of the button, start to receive screen data of a first application and screen data of a second application displayed on the first display prior to the selection of the button from the first electronic device, and simultaneously display, on the second display, the screen data of the first application and the screen data of the second application transmitted from the first electronic device.

10. The second electronic device of claim 9, wherein the screen data of the second application is displayed as a window.

11. The second electronic device of claim 9, further comprising an input/output device that receives an input from a user.

12. A first electronic device for a multi display, the first electronic device comprising:

a first display configured to display a screen;

a communication interface configured to one of transmit and receive data; and at least one processor configured to:

transmit a model name of the first electronic device to a second electronic device, execute a first application and a second application, generate screen data of the first application and screen data of the second application on the screen of the first display, simultaneously display the screen data of the first application and the screen data of the second application at the first electronic device, and in response to selection of a button that has a function of displaying the screen data of the first application and the screen data of the second application on a second display of the second electronic device and that is displayed on the second display of the second electronic device without being displayed on the first electronic device, start to transmit the screen data of the first application and the screen data of the second application displayed on the first display prior to the selection of the button to the second electronic device through the communication interface.

13. The first electronic device of claim 12, wherein the at least one processor is further configured to display the screen data of the first application and the screen data of the second application on the first display before transmitting the screen data of the first application and the screen data of the second application to the second electronic device.

14. The first electronic device of claim 12, wherein the button is included in a preset area of a first screen image displayed on the second display, the first screen image includes a representation of an appearance of the first electronic device, and the preset area includes a representation of the first display of the first electronic device.

15. The first electronic device of claim 14, wherein the transmitted screen data of the first application and the transmitted screen data of the second application are displayed in the preset area of the first screen image displayed on the second display.

16. The first electronic device of claim 15, wherein the first electronic device includes a first key disposed outside of the first display, the first screen image includes a second key corresponding to the first key, and the second key is disposed outside of the preset area, and wherein the first electronic device is configured to perform a predetermined function in response to selection of the second key.

* * * * *